(12) United States Patent
Higashino et al.

(10) Patent No.: US 7,682,138 B2
(45) Date of Patent: Mar. 23, 2010

(54) FLUID TRANSFERRING SYSTEM AND MICROPUMP SUITABLE THEREFOR

(75) Inventors: Kusunoki Higashino, Osaka (JP); Yasuhisa Fujii, Kyoto (JP); Shunichi Hayamizu, Amagasaki (JP); Yasuhiro Sando, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 765 days.

(21) Appl. No.: 11/416,532

(22) Filed: May 3, 2006

(65) Prior Publication Data

US 2006/0204381 A1   Sep. 14, 2006

Related U.S. Application Data

(62) Division of application No. 10/387,946, filed on Mar. 13, 2003, now Pat. No. 7,094,040.

(30) Foreign Application Priority Data

| Mar. 27, 2002 | (JP) | .............................. 2002-088284 |
| Nov. 29, 2002 | (JP) | .............................. 2002-348285 |
| Nov. 29, 2002 | (JP) | .............................. 2002-348286 |

(51) Int. Cl.
F04B 17/03 (2006.01)
F15C 1/06 (2006.01)
F15C 1/18 (2006.01)

(52) U.S. Cl. ...................... 417/413.3; 137/833; 137/842

(58) Field of Classification Search ............. 417/413.2, 417/413.3; 137/512, 814, 822, 842, 853, 137/833

See application file for complete search history.

(56) References Cited

U.S. PATENT DOCUMENTS

| 4,216,477 | A |   | 8/1980 | Matsuda et al. .......... 417/413.3 |
| 4,631,553 | A | * | 12/1986 | Sekiya ......................... 347/54 |
| 4,822,250 | A | * | 4/1989 | Tsubouchi et al. ............ 417/45 |
| 5,265,636 | A | * | 11/1993 | Reed ............................ 137/14 |
| 6,227,824 | B1 |   | 5/2001 | Stehr .......................... 417/540 |
| 6,498,862 | B1 |   | 12/2002 | Pierson et al. .............. 382/133 |
| 2002/0009374 | A1 |   | 1/2002 | Higashino .................. 417/322 |
| 2002/0127736 | A1 |   | 9/2002 | Chou et al. ................. 436/180 |
| 2003/0185692 | A1 | * | 10/2003 | Ng et al. .................. 417/413.2 |

FOREIGN PATENT DOCUMENTS

JP    2001-322099 A   11/2001

OTHER PUBLICATIONS

Anders Olsson, Peter Enoksson, Göran Stemme and Erik Stemme, *An Improved Valve-Less Pump Fabricated Using Deep Reactive Ion Etching*, MEM '96 (IEEE), pp. 479-484.

* cited by examiner

*Primary Examiner*—Charles G Freay
(74) *Attorney, Agent, or Firm*—Sidley Austin LLP

(57) ABSTRACT

Disclosed herein is a micro fluid transferring system that comprises a micropump having a chamber, a first fluid transferring portion connected to the chamber, and a second fluid transferring portion connected to the chamber. This system is characterized in that at least one of the first and second fluid transferring portions comprises a pressure absorbing section for absorbing or alleviating a liquid vibrational pressure therein.

4 Claims, 16 Drawing Sheets

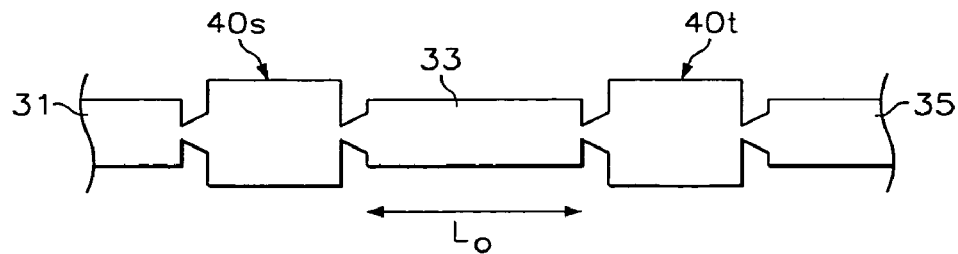
FIG. 15
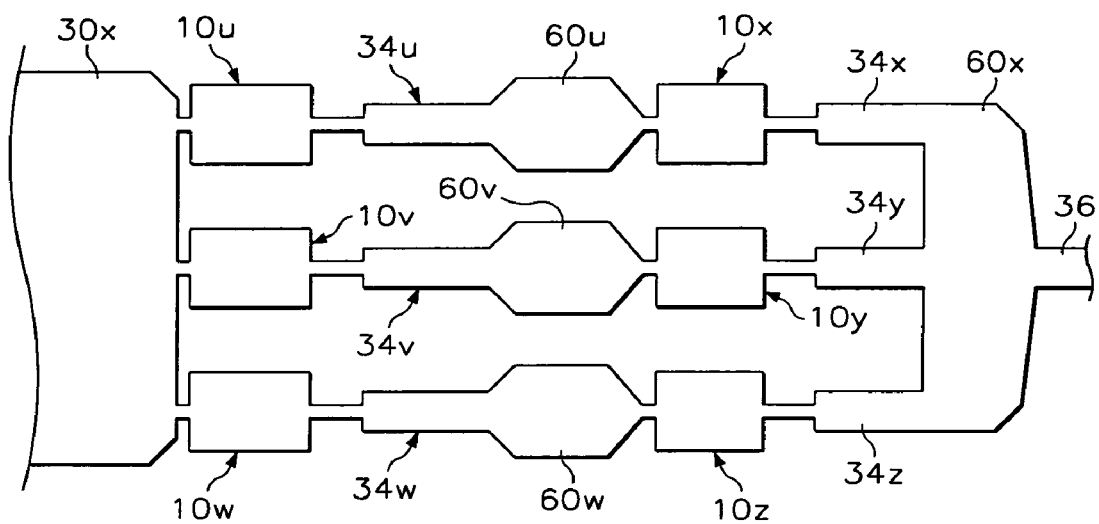
FIG. 16
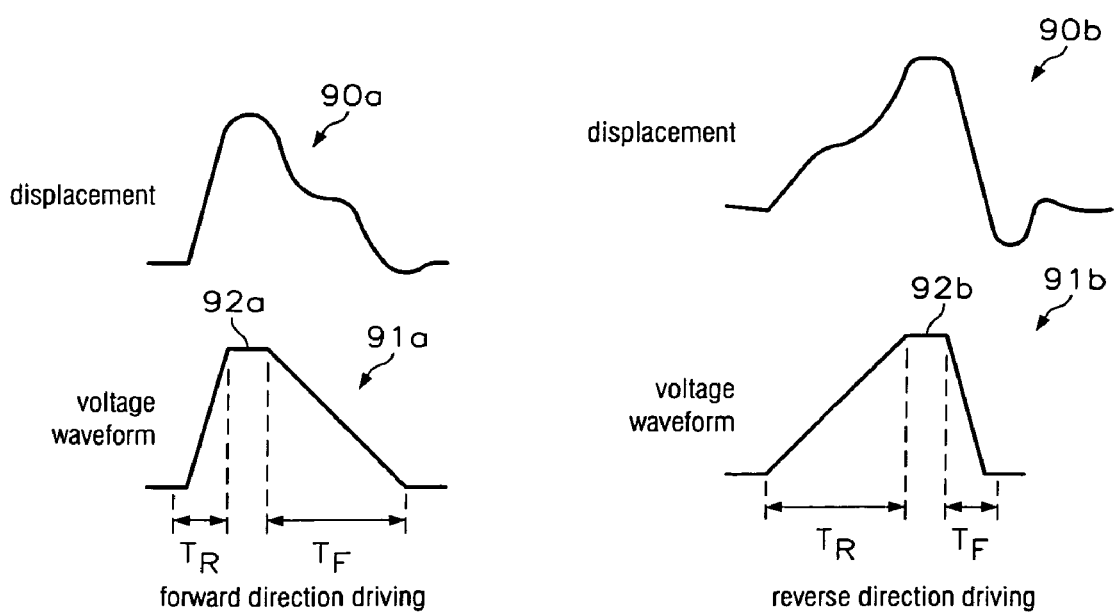
FIG. 17(a)
FIG. 17(b)

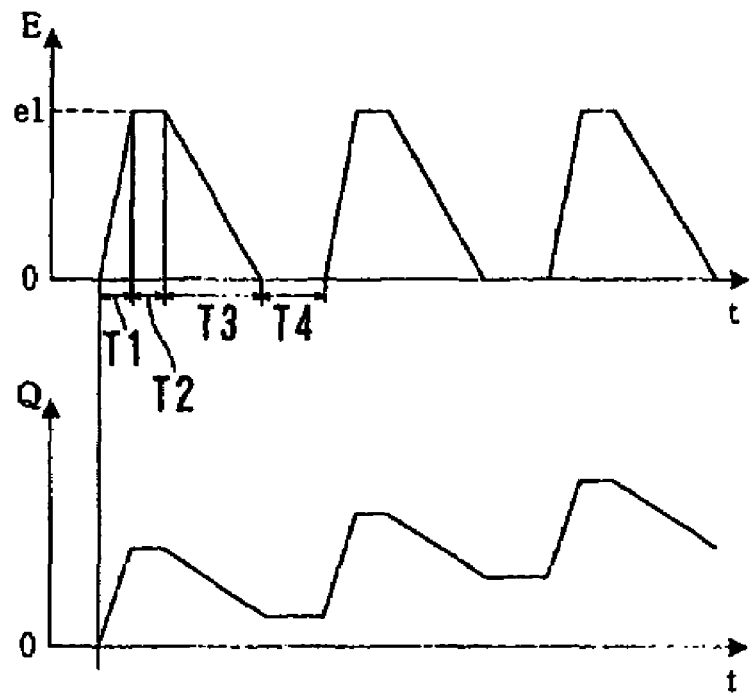
FIG. 20(a)
FIG. 20(b)
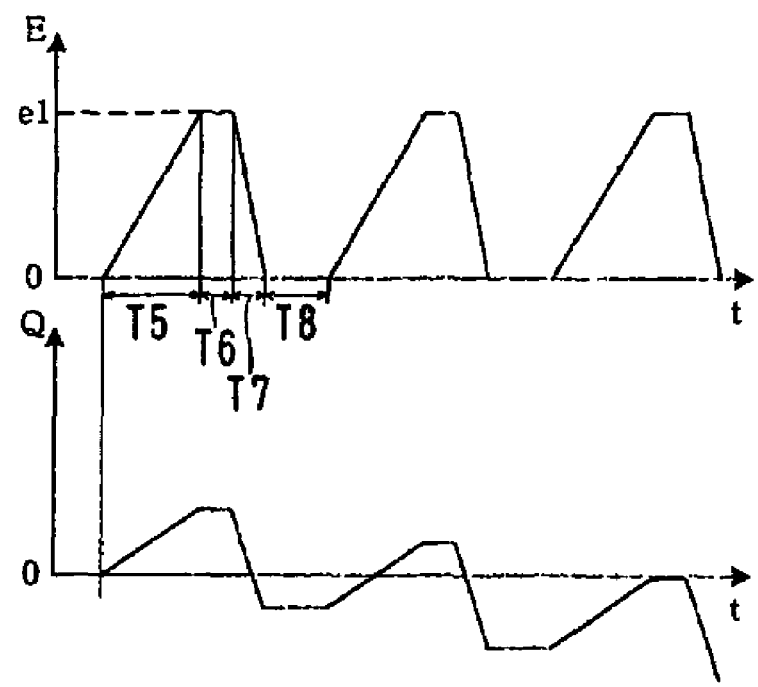
FIG. 21(a)
FIG. 21(b)

opening section 14 opening section group 14

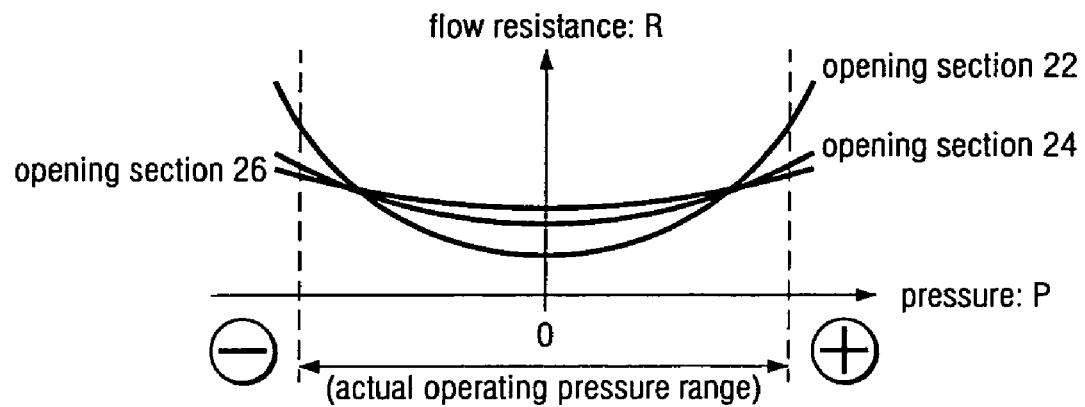
FIG. 28
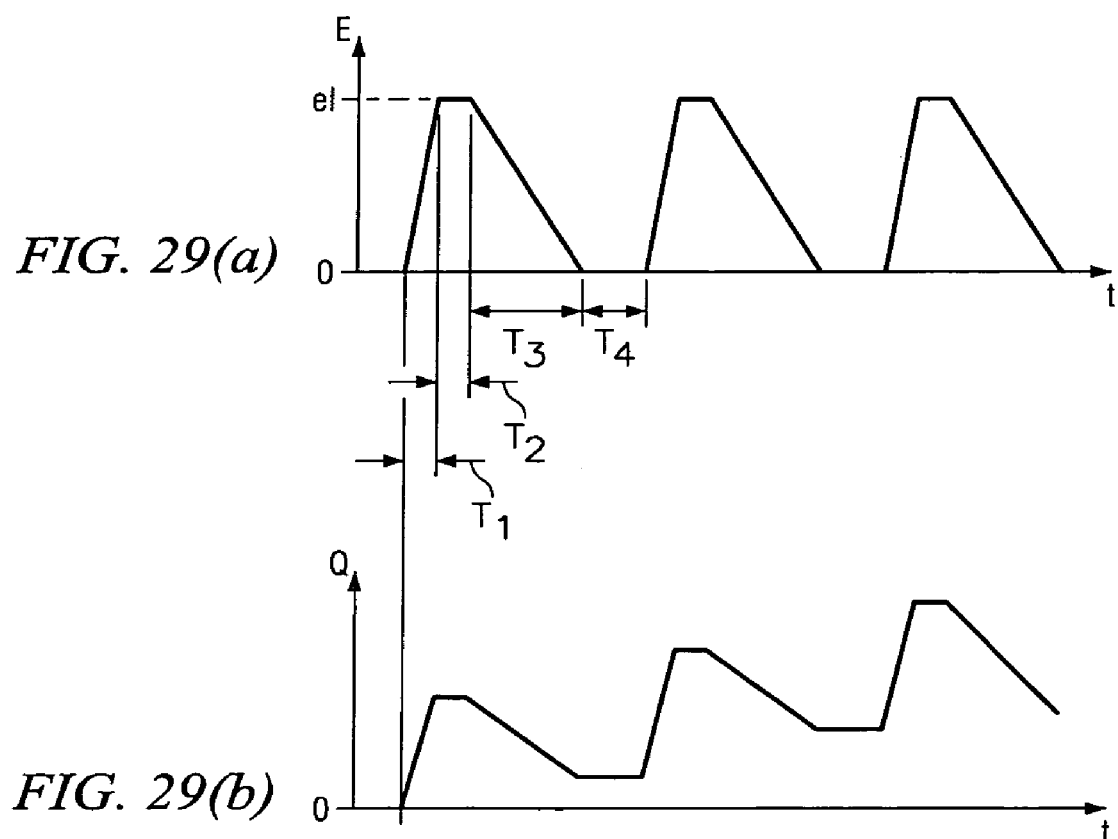
FIG. 29(a)
FIG. 29(b)

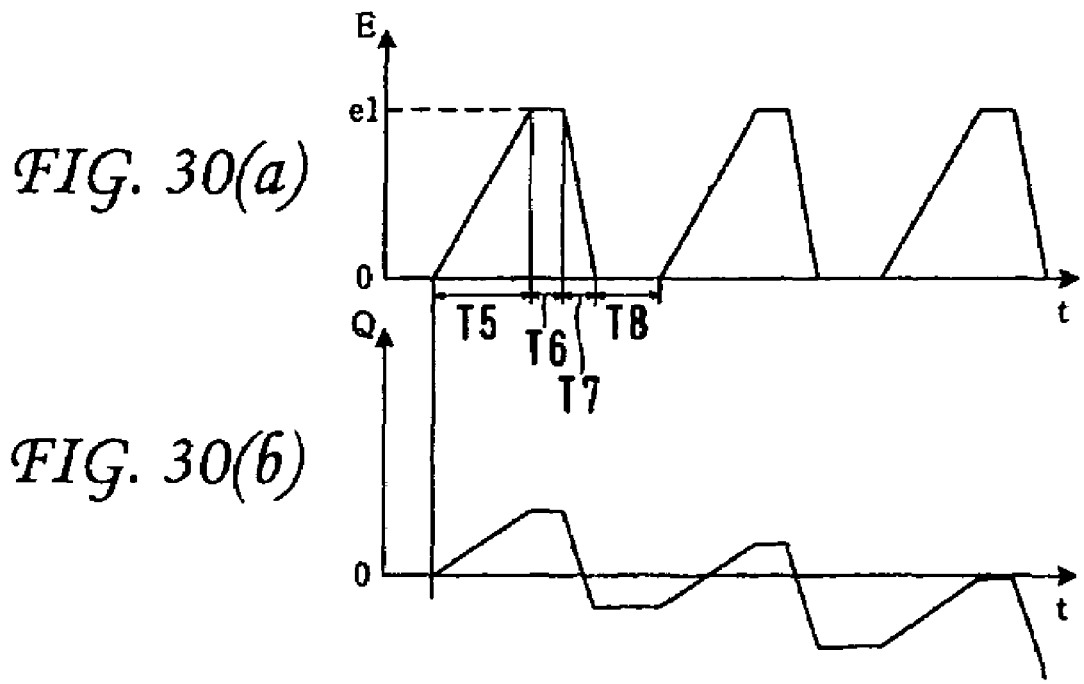
FIG. 30(a)
FIG. 30(b)
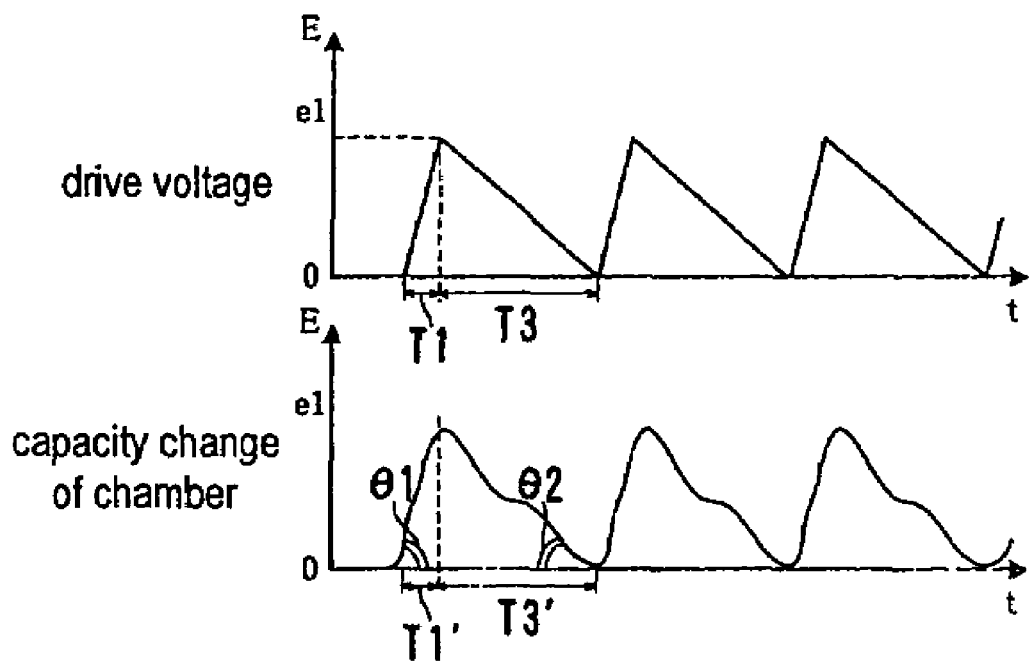
drive voltage
capacity change of chamber
FIG. 31

FLUID TRANSFERRING SYSTEM AND MICROPUMP SUITABLE THEREFOR

CROSS-REFERENCE TO RELATED APPLICATIONS

This application is a divisional application of application Ser. No. 10/387,946, filed Mar. 13, 2003, now U.S. Pat. No. 7,094,040, issued Aug. 22, which is based on Japanese Patent Application Nos. 2002-088284, 2002-348285, and 2002-348286 filed with Japan Patent Office on Mar. 27, 2002, Nov. 29, 2002, and Nov. 29, 2002, respectively, the entire contents of which are hereby incorporated by reference.

BACKGROUND OF THE INVENTION

1. Field of the Invention

The present invention relates to a fluid transferring system, and particularly, to a fluid transferring system transferring a small amount of a fluid, e.g., liquid or gas, with high precision using a micropump. The present invention further relates to a micropump suitable for being used in the fluid transferring system.

2. Description of the Related Art

Various kinds of micropumps transferring a small amount of liquid have been heretofore proposed. A micropump is incorporated in a fluid transferring system for use in a chemical analysis or the like using a small amount of liquid.

For example, a mocropump is disclosed in Japanese Patent Laid-Open Patent Publication 2001-322099A, a chamber of which is connected to an external channel through an opening section. Furthermore, another disclosure is given in an article entitled "AN IMPROVED VALVE-LESS PUMP FABRICATED USING DEEP REACTIVE ION ETCHING," appeared in Anders Olsson et al., MEMS'96 (IEEE), 479 to 484, in which two micropumps are installed in parallel and driven with a phase difference therebetween to thereby cancel a mutual influence.

According to a construction of a fluid transferring system, a case arises where a characteristic thereof becomes deteriorated under an influence of an external flow channel. For example, in a case, a pressure compressional wave produced by a vibration accompanying driving of a micropump is reflected to interfere with the original wave according to a length and shape of the flow channel, thereby disabling achievement of a desired characteristic.

SUMMARY OF THE INVENTION

It is accordingly a technical object that the present invention seeks to solve is to provide a fluid transferring system and/or micropump capable of improving fluid transferring efficiency thereof.

Another technical object of the present invention is to provide a fluid transferring system and/or a micropump capable of preventing deterioration of a characteristic thereof.

Yet another technical object of the present invention is to provide a fluid transferring system and/or a micropump capable of improving fluid transferring efficiency thereof by giving multiple functions to the micropump.

A fluid transferring system reflecting an aspect of the present invention comprises: a micropump having a chamber; and first and second fluid transferring portions respectively connected to the chambers, wherein at least one of the first and second transferring portions has a pressure absorbing section for absorbing or alleviating a liquid vibrational pressure. Each of the first and second fluid transferring portions may be in a form of flow channel or a fluid reservoir, and may be connected with the chamber through an opening section or closing valve.

In the above construction, the liquid vibrational pressure produced in company with driving of the micropump is absorbed or alleviated in the pressure absorbing section, thereby enabling decrease in the liquid vibrational pressure propagated from the pressure absorbing section.

With the above construction adopted, for example, in a case where occurrence of a turbulent flow is prevented by a liquid vibrational pressure to thereby disable a desired characteristic to be obtained in a fluid transferring system capable of transferring a liquid by producing a desired turbulent flow in a liquid spouting from an inlet of a micropump, an adverse influence of the liquid vibrational pressure can be alleviated by absorbing or reducing the liquid vibratioal pressure with the pressure absorbing section installed in the inlet side. Furthermore, by installing a pressure absorbing section on the outlet side, a high frequency pulsating component is alleviated and a subsequent liquid stream can be of a near laminar flow. Alternatively, a pressure absorbing section is installed in a propagation path of a liquid vibrational pressure to absorb or alleviate the liquid vibrational pressure, thereby enabling no return of a reflected wave to the micropump or reduction in the reflected wave returning back to the micropump either.

Therefore, deterioration of a characteristic of a fluid transferring system can be prevented from occurring.

At least a portion of the pressure absorbing section is preferably defined by a wall forming a portion of the at least one of the first and second fluid transferring portions and a thickness of the wall portion of the pressure absorbing section is thin enough to be deformable.

Since, in the above construction, a thickness of the wall is set thin enough to be deformable, the wall is deformed when a liquid vibrational pressure acts thereon, thereby enabling absorption or alleviation of the liquid vibrational pressure through a change in volume.

A relation is preferably established in which the sum of the absolute values of a change in capacity (Cdr) of the at least one of the first and second fluid transferring portions that comprises the pressure absorbing sections caused by deformation when a unit pressure is applied thereto; and change in volume (Cwr) of a liquid residing in the at least one fluid transferring portions that comprises the pressure absorbing section when the same unit pressure is applied thereto is larger than the sum of the absolute values of a change in capacity (Cdc) of the chamber when a unit pressure is applied thereto and a change in volume (Cwc) of the liquid in the chamber when the same unit pressure is applied thereto. That is, $$|Cdr|+|Cwr|<|Cdc|+|Cwc| \quad (1)$$

According to the above construction, a liquid vibrational pressure produced in the chamber by driving of the micropump can be absorbed in the flow channel or liquid reservoir including the pressure absorbing section.

The pressure absorbing section is preferably present across a length ½ or more times a wavelength of a pressure compressional wave corresponding to a driving cycle of the micropump in a fluid transferring direction of the at least one of the first and second fluid transferring portions. A change in capacity of the pressure absorbing section when a unit pressure is applied to the pressure absorbing section is larger than a change in volume of a liquid in the pressure absorbing section when the same unit pressure is applied to the liquid.

With the above construction adopted, propagation of a pressure compressional wave in which a portion to propagate forward and a portion to propagate backward are alternately present repeatedly, with each portion having one half wavelength, can be blocked or reduced in the pressure absorbing section.

Furthermore, a fluid transferring system reflecting another aspect of the present invention comprises: a micropump having a chamber; and first and second fluid transferring portions respectively connected to the chamber, wherein at least one of the first and second fluid transferring portions comprises a pressure reflecting section for reflecting a part of a pressure compressional wave propagating in a direction of moving away from the chamber, to the chamber side. Each of the first and second fluid transferring portions may be in a form of flow channel or a fluid reservoir, and may be connected with the chamber through an opening section or closing valve.

According to the above construction adopted, the reflected wave directed to the chamber side can be caused to properly interfere with an original wave propagating toward the reflecting section from the chamber so as not to cause an adverse influence by interference and furthermore to thereby use the interference intentionally to improve a characteristic of the micropump.

Therefore, it can prevent the deterioration of characteristics of a fluid transferring system.

The pressure reflecting section preferably includes: a portion of which an effective acoustic impedance is discontinuous or a flow channel bends with a sharp angle.

In the above construction, reflection of a pressure compressional wave occurs in a portion where an effective acoustic impedance is discontinuous or a flow channel bends with a sharp angle. Herein, an effective acoustic impedance can be calculated using an acoustic capacitance in consideration of not only a change in volume of a fluid itself, but also a change in capacity of a space confining the liquid, that is a flow channel or the like.

Moreover, a fluid transferring system reflecting still another aspect of the present invention comprises: a micropump having a chamber to which a first opening section and a second opening section are formed, wherein, when a pressure in the chamber is raised or lowered, a change percent in flow channel resistance at the first opening section is smaller than a change percent in flow channel resistance at the opening section; and first and second fluid transferring portions respectively connected to the chamber though the first and opening sections, respectively, wherein the first fluid transferring portion has a reflecting section for reflecting a part of a pressure compressional wave propagating in a direction of moving away from the chamber, to the chamber side. A distance in the flow channel or liquid reservoir to the reflecting section from the one opening section is ½ or less times a wavelength of a pressure compressional wave corresponding to a driving cycle of the micropump.

In the fluid transferring system of the above construction, since a change percent in flow channel resistance at the one opening is smaller than a change percent in flow channel resistance at another opening section, a ratio of a flow in passage between the respective opening sections is different according to whether a pressure in the chamber is on the rise or fall and liquid transfer is thereby realized using the nature of the system.

In the above construction, in order to obtain a good liquid transfer characteristic, a flow channel resistance at the one opening section desirably changes in value by the lowest possible amount. In order to realize the condition, it is preferably required to prevent a pressure from changing largely at the one opening. To be concrete, it is preferably required that a distance from the one opening section to the reflecting section is set to cause the pressure compressional wave propagating toward the reflecting section from the one opening section to cancel the reflecting wave reflected toward the one opening section in the reflecting section while avoiding a value in the vicinity of N times (N=1, 2, . . . ) a half wavelength of a pressure compressional wave. When N becomes larger, however, not only does an effect to cancel each other decrease because of attenuation of the reflecting wave, but also a result different from the intention altogether would be easily obtained if a phase difference is shifted because of a slight design error or external disturbance. On the other hand, when a distance from the one opening section to the reflecting section is ½ or less times a wavelength of the pressure compressional wave, attenuation of the reflected wave is small to thereby increase a canceling effect, thereby enabling a target result to be obtained even in the presence of design error and external disturbance.

When a fluid transferring system is constructed with plural micropumps in connection so as to include at least one of the above contrivances of construction, mutual interferences of the micropumps can be prevented from occurring; therefore, a high characteristic of the system can be stably obtained. To be concrete, the construction is as follows.

The chambers of the above micropumps are arranged in parallel to each other. The flow channels or the liquid reservoirs communicating with the respective chambers are merged.

According to the above construction, for example, in a case where plural micropumps are adopted in order to increase a flow rate, a desired characteristic can be attained.

As a different construction, the chambers of the plural micropumps are preferably arranged in series with each other. Adjacent ones of the chambers are connected to each other through at least one of the openings section (or the closing valves), the flow channels and the liquid reservoirs.

According to the above construction, for example, in a case where plural microumps are employed in order to raise a pressure, a desired characteristic can be obtained.

Furthermore, the present invention provides a fluid transferring system of the following construction in order to solve the above technical problems.

The fluid transferring system is constructed so that chambers of plural micropumps are arranged in series with each other. A length of a connecting section connecting adjacent ones of the chambers is shorter than a half wavelength of a pressure compressional wave corresponding to a driving cycle of the micropumps. Adjacent ones of the chambers are driven in respective different driving waveforms or with a different phase difference therebetween.

In the above construction, a length of a connecting section is designed to be shorter than ½ times a wavelength of a pressure compressional wave to thereby cause a reflecting wave and an original wave to properly interfere with each other so as not to produce an adverse influence due to interference, or furthermore, interference is intentionally used so as to improve a fluid transferring characteristic of a micropump. Furthermore, adjacent chambers are driven in respective different driving waveforms or with a phase difference therebetween not only so as to prevent resonance between adjacent micropumps, but also so as to cause proper interference between pressure compressional waves produced by driving respective micro pumps, thereby enabling intentional use of the interference for improvement on fluid transferring characteristic.

Therefore, a characteristic of a fluid transferring system can be prevented from deteriorating.

Furthermore, a fluid transferring system reflecting still another aspect of the present invention is of a type in which chambers of plural micropumps are arranged in series with each other and a length of a connecting section connecting adjacent ones of the chambers is ¼ or more times a wavelength of a pressure compressional wave corresponding to a driving cycle of the micropumps.

In a case where plural micropumps are connected in series with each other, a length of a connecting section between chambers of the micropumps shorter than ¼ times a wavelength of a pressure compressional wave cannot be used for improvement on a fluid transferring characteristic since a reflected wave does not cancel an original wave in interference, but to the contrary, a possibility arises that the shorter distance exerts an adverse influence. According to the above construction, since a length of the connection section is ¼ or more times a pressure compressional wave, the interference between the reflected wave and the original wave can prevent an adverse influence of the interference and can be intentionally used to improve a characteristic.

Therefore, a characteristic of a fluid transferring system can be prevented from deteriorating.

A micropump reflecting still another aspect of the present invention comprises: a chamber; a first opening section including a plurality of sub-opening sections, each of the sub-opening sections being for connecting the chamber with a first fluid transferring portion, the sub-opening sections having an effective sectional area smaller than that of the first fluid transferring portion and showing, as a whole, a first flow channel resistance that changes depending on change in differential pressure between the chamber and the first fluid transferring portion; and a second opening section for connecting the chamber with a second fluid transferring portion, the second opening section having an effective sectional area smaller than that of a the second fluid transferring portion, the second opening section showing a second flow channel resistance that changes depending on change in differential pressure between the chamber and the second fluid transferring portion, wherein the differential pressure dependency of the first flow channel resistance is smaller than that of the second flow channel resistance.

In a case where the micropump further comprises another opening section(s) for connecting the chamber with another fluid transferring portion(s), the differential pressure dependency of the first channel resistance is preferably smaller than those of the remaining ones.

Furthermore, in the sub-opening sections of the first opening section, the minimum of ratios of flow channel lengths to sectional areas of the respective sub-opening sections is set to be larger than a ratio of flow channel length to the sectional area of the second opening section. With the construction in which the chamber communicates with the first fluid transferring portion through the plurality of sub-opening sections, reduction occurs in pressure dependency as a whole of the first opening section thereby increase a difference in pressure dependency between the first and second opening sections. By doing so, improvement is achieved on a flow rate characteristic and efficiency of a pump.

A fluid control system reflecting still another aspect of the present invention comprises: a chamber; a first opening section for connecting the chamber with a first fluid transferring portion, the first opening section having an effective sectional area smaller than that of the first fluid transferring portion and showing a first flow channel resistance that changes depending on change in differential pressure between the chamber and the first fluid transferring portion; a second opening section for connecting the chamber with a second fluid transferring portion, the second opening section having an effective sectional area smaller than that of a the second fluid transferring portion, the second opening section showing a second flow channel resistance that changes depending on change in differential pressure between the chamber and the second fluid transferring portion; and a third opening section for connecting the chamber with a third fluid transferring portion, the third opening section having an effective sectional area smaller than that of a the third fluid transferring portion, the third opening section showing a third flow channel resistance that changes depending on change in differential pressure between the chamber and the third fluid transferring portion, wherein the differential pressure dependency of the first flow channel resistance is different from those of the second and third flow channel resistances.

In the above mentioned structure, the differential pressure dependency of the second flow channel resistance is preferably different from that of the third flow channel resistance.

Furthermore, in a case where the differential pressure dependency of the first opening section is smaller than those of the second and third opening sections, the first opening section may preferably comprise a plurality of sub-opening sections each of which connects the chamber with the first fluid transferring portion.

Moreover, at least one of the first sub-opening sections preferably has a uniform flow channel section and is larger in a ratio of a length of flow channel to a sectional area thereof than any one of those of the second sub-opening sections and the third opening section.

Such a micro-fluid system is used in a manner such that a change ratio in flow channel resistance is caused to be altered in value according to whether a volume of the chamber increases or decreases under control of a driving voltage waveform given to the actuator to thereby transport a fluid to the opening sections or the opening section groups at flow rates and in a direction according to a value of flow channel resistance of each of them to thus merge fluid flows or divide a fluid flow.

BRIEF DESCRIPTION OF THE DRAWINGS

These and other objects, advantages, and features of the present invention will become apparent from the following description thereof taken in conjunction with the accompanying drawings in which:

FIG. 15 is a plan view of a fluid transferring system of sixth modification of the third embodiment;

FIG. 16 is a plan view of a fluid transferring system of seventh modification of the third embodiment;

FIGS. 17(a) and 17(b) are graphs of a displacement behavior and a driving voltage of a micropump of FIG. 1;

FIG. 20(a) and FIG. 21(a) are graphs showing example waveforms of driving voltage of a piezoelectric element;

FIG. 20(b) and FIG. 21(b) are model graphs showing flow rates obtained by a pumping action according to voltage waveforms shown in FIG. 20(a) and FIG. 21(a);

FIG. 28 is a graph showing a flow channel resistance characteristic of each opening section in a micropump of the fourth embodiment;

FIG. 29 and FIG. 30 are graphs showing example of a driving voltage waveforms of a piezoelectric element;

FIG. 31 is a graph showing an appearance of change in volume of a chamber 20 according to a driving voltage;

DETAILED DESCRIPTION OF THE PREFERRED EMBODIMENTS

Description will be given of examples as embodiments of the present invention based on FIG. 1 to FIGS. 19(a) and 19(b). Note that similar constituents in the figures are indicated with the same symbols.

Fist of all, description will be given of a fluid transferring system of the first example of a first embodiment with reference to FIG. 1 to FIG. 5 and FIG. 17(a) to FIG. 19(b).

Figure 1:
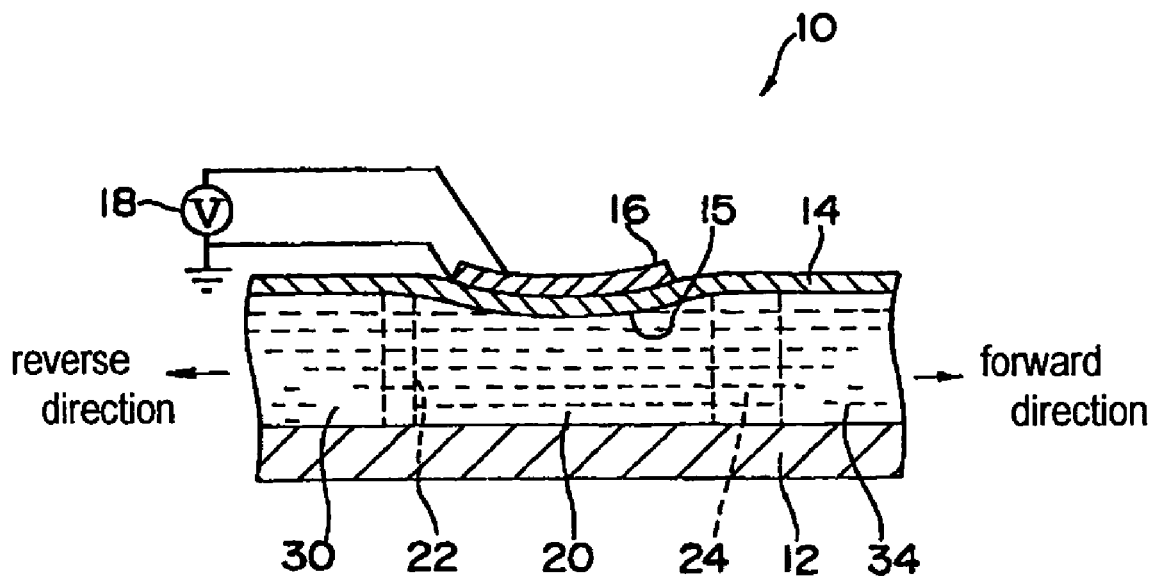
FIG. 1 is a sectional view of a micropump.
Figure 2:
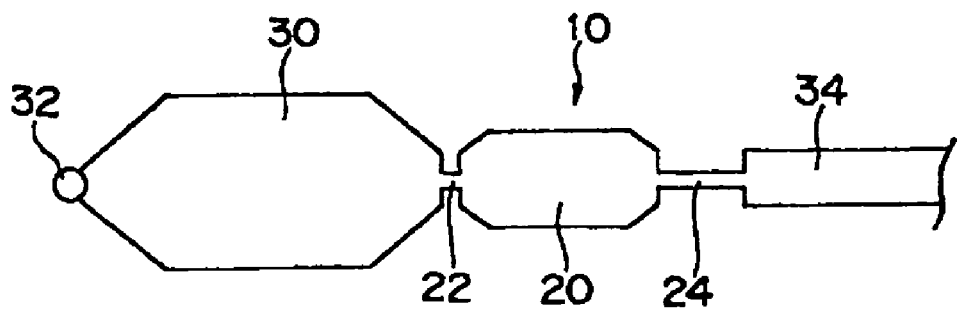
FIG. 2 is a plan view of a fluid transferring system of a first embodiment reflecting aspects of the present invention.

FIG. 1 is a sectional view of a micropump 10 used in a fluid transferring system. FIG. 2 is a plan view of the fluid transferring system.

In the fluid transferring system, a base plate 12 and a thin plate 14 are bonded together. The base plate 12 has a surface on which there are formed: recesses serving as a chamber 20 and a liquid reservoir 30; and slits serving as first and second opening sections 22 and 24 and a flow channel 34, and the thin plate 14 working as a vibrating plate is bonded onto the surface. A through hole 32 for supplying a liquid is formed in the thin plate 14 and the through hole 32 communicates with the liquid reservoir 30. A piezoelectric element 16 is fixed on the top surface of the thin plate 14 oppositely to the chamber 20. The piezoelectric element 16 and the thin plate 14 constitutes of an actuator of a monomorph structure and a voltage is applied to the piezoelectric element 16 from a driving circuit 18 to thereby bend the actuator to a curved form.

The chamber 20 is connected to the liquid reservoir 30 and the flow channel 22 through the first opening section 22 and the second opening 24, respectively. The liquid reservoir 30 has a width wider and a volume (or a capacity) larger as compared with the chamber 20, the flow channel 34. The first opening section 22 is formed so that a change percent in flow channel resistance thereof according to a differential pressure becomes larger as compared with the second opening section 24.

Figure 3:
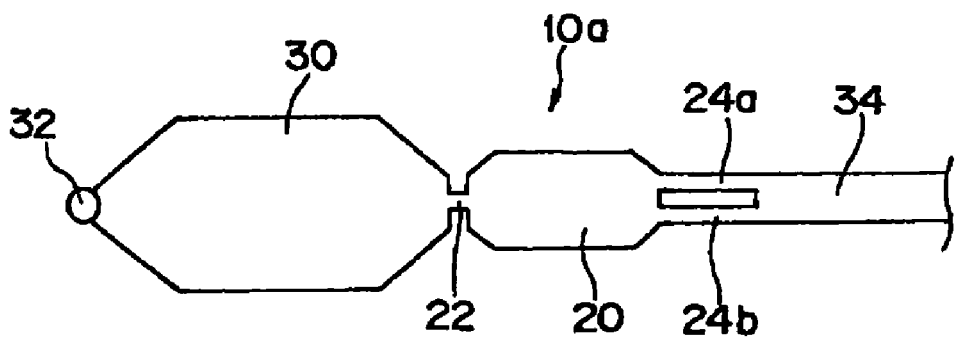
FIG. 3 is a plan view of a fluid transferring system of a first modification of the first embodiment.

Note that the first opening section 22 and the second opening section 24 are not required to be formed each as a single narrow flow channel, but, for example, like a micropump 10a in a first modification of the present embodiment shown in FIG. 3, the second opening section may also be constituted of a plurality of flow channels 24a and 24b. This may be applied to the first opening section in a similar manner.

The micropump 10 uses a mechanism of a combination of the thin plate 14 and the piezoelectric element 16 that is subjected to a curved deformation in a unimorph mode to increase or decrease a volume (or a capacity) of the chamber 20 and to change a pressure in the chamber 20. At this time, a liquid is transferred using a nature that change rates in flow channel resistance of the first opening section 22 and the second opening section 24 are different according to a pressure on the rise or fall.

That is, decrease in volume of the chamber 20 pushes out the liquid in the chamber 20 through the first and second opening sections 22 and 24. When a volume of the chamber 20 restores to the original one, the liquid is sucked into the chamber 20 through the first and second opening sections 22 and 24. By repeating the process, the liquid can be transferred in a desired direction in the following manner.

If a flow-out amount of the liquid flowing out from the chamber 20 through the first and second opening sections 22 and 23 are $V_{11}$ and $V_{21}$, and the flow-in amount into the chamber 20 through the first and second opening sections 22 and 24 are $V_{12}$ and $V_{22}$ by definition, the following equation is given:

$$V_{11}+V_{21}=V_{12}+V_{22} \qquad (2)$$

As described above, here, the first opening section 22 is formed so that a change rate in flow channel resistance according to a differential pressure is larger as compared with the second opening section 24. In other words, the differential pressure dependency of the flow channel resistance of the first opening section 22 is larger than that of the second opening section 24.

Therefore, for example, when a volume of the chamber 20 is rapidly reduced to thereby relatively increase a differential pressure and then a volume of the chamber 20 is gradually restored to thereby relatively decrease a differential pressure, the following relation is established:

$$V_{11}<V_{12} \qquad (3)$$

Furthermore, from the equation (2) and the relations (3), the following relation is given:

$$V_{21}>V_{22} \qquad (4)$$

As can be understood from the relations (3) and (4), the liquid is transferred in the forward direction in FIG. 1 as a whole.

To the contrary, when a volume of the chamber 20 is gradually decreased to make a differential pressure relatively small, and then, a volume of the chamber 20 is rapidly restored to thereby relatively increase a differential pressure, the liquid is transferred to in the reverse direction in FIG. 1.

Description will be given of one concrete example below. A photosensitive glass of 500 µm in thickness is adopted as the base plate 12, on which etching is applied to form recesses of the chamber 20 and the liquid reservoir 30, and slits of the first and second opening sections 22 and 24 and the flow channel 34, all reaching to 100 µm in depth. The first opening section 22 has dimensions of 100 µm in depth, 25 µm in width and 20 µm in length. The second opening section 24 has dimensions of 100 µm in depth, 25 µm in width and 150 µm in length. The main part of the liquid reservoir 30 is of a rectangular parallelepiped having dimensions of 100 µm in depth, 1.2 mm in width and 4.0 mm in length. The liquid reservoir 30 is formed so as to increase its width by the angle of 45 degrees, leftward and rightward, in to the interior starting at the opening section 22. The flow channel 34 has dimensions of 100 µm in depth, 150 µm in width and about 15 mm in length. The thin plate 14 is a glass plate of 50 µm in thickness, on the top surface of which the piezoelectric element 16 of 50 µm in thickness made of PZT (lead zirconate titanate) ceramic is fixed with an adhesive agent. Note that when a voltage of 30 V is applied to the piezoelectric element 16, a displacement (the maximum recess) is 80 nm, which produced a pressure of 0.4 MPa in water filling the chamber 20.

Then, description will be given of a driving voltage waveform applied to the piezoelectric element 16 of the micropump 10.

The micropump 10 is required to drive the actuator section 15 (as shown in FIG. 1, the portion of the thin plate 14 facing the chamber 20 and the piezoelectric element 16 fixed thereon) to increase or decrease a volume of the chamber 20 so that a displacement speed in vibration thereof is different according to a volume of the chamber 20 when it increases or decreases.

As for a vibration of the actuator section 15, its vibrational behavior is determined by a vibrational mode in which a vibration of a flow of the liquid resonates with a vibration of the actuator section 15 (hereinafter referred to as natural vibration) as a major factor. When a voltage is applied to the piezoelectric element 16 to vibrate the actuator section 15, the actuator section 15 can be efficiently driven by applying a driving voltage waveforms so as to attain a desired vibrational behavior paying attention to a cycle of the natural vibration.

A cycle of the natural vibration (or a natural vibration cycle) can be expressed using the following 4 acoustic factor components:

(a) an acoustic capacitance of the actuator section 15: Cp,
(b) an acoustic capacitance of a liquid in the chamber 20: Ca,
(c) an inertance of the first opening section 22: Mi and
(d) an inertance of the second opening section 24: Mo.

The "acoustic capacitance" here corresponds to compression (or deformation) in volume per a unit pressure. As for (a), deformation of the base plate 12 can be neglected and the capacitance can be calculated by obtaining only deformation in volume of the actuator section 15 when a unit pressure is applied on the inner surface of the chamber 20. As for (b), the capacitance can be calculated from a decrease in volume when a unit pressure is applied to the entire liquid in the chamber 20. Alternatively, if a density of the liquid is ρ, an acoustic velocity in the liquid is v and a volume of the chamber 20 is W by definition, the capacitance Ca is obtained by the following equation:

$$Ca = W/(\rho v^2) \quad (5)$$

If the base plate 12 is an elastic body such as made of a resin, deformation of the elastic body should be considered in the calculation of (a).

The "inertance" corresponds to a coefficient of inertia when a liquid in the flow channel is pushed out by a unit pressure. An inertance M can be calculated from an acceleration a at a pressure P with the following equation:

$$M = P/\alpha \quad (6)$$

Or, if a mass of a liquid in the flow channel is m and a sectional area of the flow channel is S by definition, the inertance M can be calculated with the following equation:

$$M = m/S^2 \quad (7)$$

As for a flow channel whose sectional area is not uniform, it is preferably required to use an integral with respect to a distance in the longitudinal direction.

Note that in a case where the first or second opening section 22 or 24 is constituted of a plurality of flow channels, it is preferable to treat these flow channels as parallel flow channels and to use an inertance of the parallel flow channels for this calculation. For example, if, as shown in FIG. 3, two flow channels 24a and 24b correspond to the second opening section, the flow channels 24a and 24b are in a parallel relationship, so an inertance of the entire second opening sections 24a and 24b is an reciprocal of the sum of reciprocals of inertances of individual flow channels 24a and 24b.

A natural vibration cycle T is given with the following equation using acoustic capacitances Cp and Ca and inertances Mi and Mo:

$$T = 2\pi((Cp + Ca) \times Mo \times Mi/(Mo + Mi)) \quad (8)$$

The natural vibration cycle T of this vibrational mode, however, is in some case shifted in value by factors under influences of flow channels connected to the micropump 10, a mass component of the actuator 16 and others. An actual value has a possibility to be shifted by a factor of the order in the range of from 0.5 to 2 times from a calculated value with the equation (8).

Note that while there is a natural vibration in a general sense derived from a mode in which the actuator section 15 vibrates singly by itself, a vibrational mode based on an interaction between the micropump 10 and external flow channels connected to the micro pump 10 and others, a voltage driving waveform herein is determined paying attention only to a vibration of the actuator section 15 and a vibration of a flow of the liquid resonating with a vibration of the actuator section 15.

Then, in FIGS. 17(a) to 19(b), there are shown examples of driving voltage waveforms for achieving desired vibrational behaviors of the actuator section 15. The following examples are presented by way of examples only in all respects, but any of driving voltage waveforms can be used without causing a problem as far as a vibrational velocity of the actuator section 15 is different according to a volume of the chamber 20 when it increases or decreases. For example, one cycle including an increase in volume and a decrease in volume of the chamber 20 may be realized by a combination of plural driving voltage waveforms. Alternatively, while the case is exemplified where the piezoelectric element 16 is used in order to deform the chamber 20, there may be used a driving mechanism other than it (for example, an electrostatic actuator, a magnetostrictive element, shape memory alloy or the like).

FIGS. 17(a) and 17(b) show driving voltage waveforms 91a and 91b different in rise time $T_R$ and fall time $T_F$, and waveforms 90a and 90b of displacement behaviors (deflections) of the piezoelectric element 16 corresponding to the driving voltage waveforms. The driving voltage waveform 91a in driving in a forward direction has a relation of $T_R<T_F$ while the driving voltage waveform 91b in driving in a reverse direction has a relation of $T_R>T_F$.

At least one of the rise time $T_R$ and fall time $T_F$ is preferably a natural vibration cycle T or more. This is because in a case where a voltage applied to the piezoelectric element 16 gradually changes over a time longer than a cycle of the natural vibration, a vibrational behavior of the actuator section 15 is harder to receive an influence of the natural vibration; therefore, the vibrational behavior is easier to follow a voltage waveform and as a result, the vibrational behavior of the actuator 15 is controlled with ease.

Note that while the driving voltage waveforms 91a and 91b are of a trapezoid, plateaus 92a and 92b at the tops thereof are not always necessary.

Figure 18A:
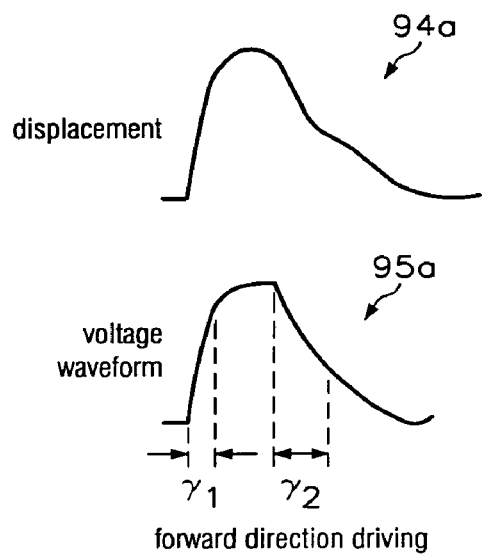
FIGS. 18(a) and 18(b) are other graphs of a displacement behavior and a driving voltage.
Figure 18B:
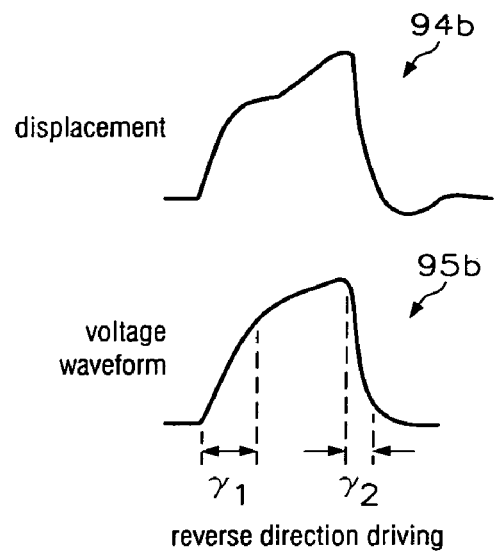

Driving voltage waveforms 95a and 95b and waveforms 94a and 94b of displacement behaviors of the piezoelectric element 16 of FIGS. 18(a) and 18(b) are cases where the driving voltage waveforms 95a and 95b are rounded with time constants $\tau_1$ and $\tau_2$ determined by a capacitance, an electric resistance and others. For example, such deformation of the waveforms can be realized by differentiating a wiring resistance of a switching circuit in between charging and discharging to change time constants $\tau_1$ and $\tau_2$ or by incorporating a rectifying element such as a diode and a non-linear element in a driving circuit or wiring to differentiate a charge time and discharge time from each other. Furthermore, by using a capacitance variable with respect to a voltage such as an electrostatic actuator, the time constants $\tau_1$ and $\tau_2$ changes with time, so, as a result the rounded driving voltage waveforms 95a and 95b can be realized.

Figure 19A:
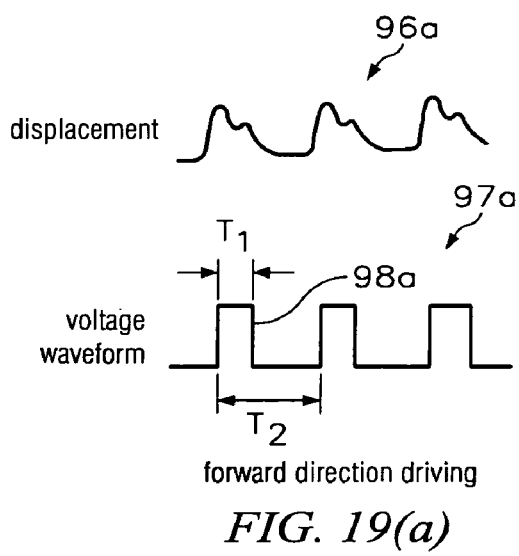
FIGS. 19(a) and 19(b) are still other graphs of a displacement behavior and a driving voltage.
Figure 19B:
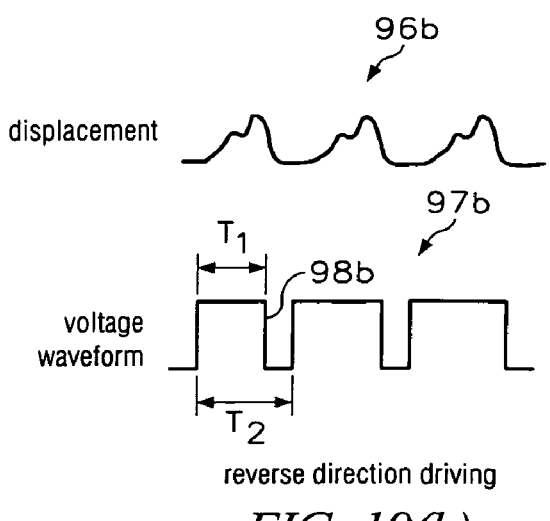

In FIGS. 19(a) and 19(b), there are shown driving voltage waveforms 97a and 97b using pulse waveforms 98a and 98b such as a rectangular wave, and waveforms 96a and 96b of displacement behaviors of the piezoelectric element 16. A driving cycle $T_2$ of the driving voltage waveforms 97a and 97b is slightly shifted from a natural vibration cycle T. If the range of the driving cycle $T_2$ is about ½ time to 2 times a natural vibration cycle T, this method is effective. This is a driving method in which a phenomenon is used that if duty ratio ($T_1/T_2$) of the driving pulses 98a and 98b is changed, changes occur in lengths of a rise time and a fall time in displacement of the piezoelectric element 16. Liquid transfer in two directions can be realized by using a nature reversing a relationship in length between a rise time and a fall time at a duty ratio of 50% as a boundary. Note that it is not necessary that the pulse waves 98a and 98b are of rectangular, but may be of a triangular, trapezoidal or the like.

Then, description will be given of absorption of pulsation pressures generated by the micropump.

As shown in FIG. 1, the top wall of the liquid reservoir 30 is made of the thin plate 14. This construction can be applied to alleviate the pulsation in pressure of a liquid spouting from the first opening section 22 outside the chamber 20, thereby enabling a stable characteristic to obtained.

In order to discuss a characteristic of pressure absorption in terms of numerical sense, a concept may well be used that as described above, "an acoustic capacitance C=compression (or deformation) in volume per a unit pressure." It is considered that with a larger value, a higher degree of pressure absorption for alleviation is realized since more of a instant change in pressure is absorbed by deformation (compression). Note that the capacitance should be evaluated with the sum of two components of a factor associated with compressibility of a liquid (Cw) and a factor associated with deformation of the thin plate 14 on the top wall (Cd).

Herein, if a density of a liquid is ρ and an acoustic velocity (a propagation velocity of a plane pressure wave) is v and a volume is X by definition, Cw can be expressed by the following equation:

$$Cw=X/(\rho \times c^2) \quad (9)$$

Furthermore, as for deformation of the thin plate 14 of the top wall, there can be used an equation of a known "an iso-pressure strain in a plate of a constant thickness with fixed 4 sides thereof." If as to the plate, a thickness is t, a width is w and Young's modulus is E by definition, Cd can be expressed by the following equation:

$$Cd=\alpha \times L \times w^5/(2 \times E \times t^3) \quad (10)$$

Herein, α is a dimensionless constant and when a ratio of a width and a length is 2 or more, α≈0.0028.

To be concrete, if the sum of the absolute values of capacitance values C of the liquid reservoir 30 is larger than that of the chamber 20, the liquid reservoir 30 plays a role as a pressure absorbing section. This is because, since a pressure compressional wave is produced by deformation of the wall surface of the chamber 20, a deformation in volume caused by the pressure in a portion harder (smaller in capacitance) than the wall of the chamber 20 is equal to or smaller than a volume vibrational amount produced in the chamber 20, which makes the portion improper as a pressure absorbing section.

In the above concrete example, since the liquid reservoir 30 is larger in volume than the chamber 20 by a factor of 3 or more-fold, Cw is three or more-fold. Moreover, since a width of the liquid reservoir 30 portion of the thin plate 14 is larger than that of a portion of the thin plate 14 of the chamber 20 by a factor of 2.4-fold and does not disturb a displacement of the thin plate 14, Cd is about 80 or more-fold. Therefore, since the total capacitance of the liquid reservoir 30 is sufficiently larger than a capacitance of the chamber 20, a sufficient effect can be expected.

While in this embodiment, one pressure absorbing section (the liquid reservoir 30) is installed at a position very close to an outlet of the first opening sections 22, even if at least one of the position and the number of the pressure absorbing sections is different from this embodiment, the effect is still ensured. Moreover, a pressure absorbing section may be at some mid point in the flow channel 34 in the second opening section 24 side.

Note that as for the micropump 10 shown in FIGS. 1 and 2, it is very significant that the liquid reservoir 30, which is a pressure absorbing section, is installed at the position immediately close to the outlet of the first opening section 22.

This is because in the micropump 10 of this type, a characteristic is used that a flow channel resistance of the first opening section 22 increases under a high pressure by an effect of a turbulent flow produced in the vicinity of the first opening section 22, therefore, a necessity arises for controlling a value of differential pressure across both ends of the first opening section 22 so as to achieve a target value with good precision. Therefore, again this is because as for a pressure (in the liquid reservoir 30) at a position very close to the outlet of the first opening section 22, a necessity arises for holding the pressure at the outlet to a value sufficiently lower than a peak of an inner pressure of the chamber 20 at all times.

In other words, the micropump 10 of this type is driven by use of a large change in flow channel resistance caused by the presence or absence of a turbulent flow produced in the vicinity of the first opening section 22. While a case occurs where no desired turbulent flow is produced under an influence of a pulsation during when the micropump 10 is driven, the desired turbulent flow can be produced if the liquid reservoir 30 is constructed so as to work as an pressure absorbing section to thereby exclude an influence of the pulsation, thereby enabling improvement on characteristic and stabilization thereof.

The top wall of the flow channel 34 is made of the thin plate 14. Since the flow channel 34 is narrower in width as compared with the reservoir 30, the flow channel shows no pressure absorbing characteristic as large as the liquid reservoir 30, but shows the following effect.

That is, in a case where the flow channel 34 is long, motion of a liquid in the second opening section 24 receives directly an influence of an inertia force of the liquid of the flow channel 34. Hence, a vibration responsive to a driving cycle of the pump 10 is obstructed to thereby, enable expectation to prevent a problem of disabling normal liquid transfer due to the pulsation beforehand.

To be detailed, the inertia force of a flow channel is proportional to an inertance (an acoustic inertia coefficient) M. An inertance M, as is described in connection with the equation (7), is proportional to a length of a flow channel and inversely proportional to the square of a sectional area. Therefore, with a shallower flow channel, a narrower width thereof and a smaller sectional area thereof, and furthermore with a longer flow channel, the inertance is easier to receive an influence of an inertia of the flow channel. An inertia force is also proportional to an acceleration, however. Therefore, while a prescribed pressure is applied to a uniform flow throughout all the flow channel covering all the flow channel, as to propagation of a high frequency vibration, only an inertia force for a half length of the wavelength effectively works. This is because as to propagation of a high frequency vibration, there are alternately present a portion with a half wavelength to propagate forward and a portion with a half wavelength to propagate backward in each one wavelength.

A wavelength in propagation of a high frequency vibration in the flow channel can be expressed using the above acoustic capacitance C and an inertance M. If a capacitance per a unit length is Ca and an inertance per a unit length is Ma by definition, a length of a half wavelength Lh of a vibration with a vibrational cycle T is given by the following equation:

$$Lh = T/\sqrt{(Ma \times Ca)} \quad (11)$$

As can be understood from the equation (11), with a larger capacitance per a unit length: Ca, a length: Lh for which an inertance effectively works for a high frequency vibration decreases (that is, an effective inertance decreases). In order to realize "a construction of pressure absorption", a width of the flow channel 34 is increased and the thin plate 14 of the top wall is thinned to increase a capacitance, thereby enabling expectation of the above effect. Note that, this method is also a useful means in addition to solution of the above object for a case where design is used in a system of a good response even with a construction having a long flow channel or for a case where pulsation vibration is desired to intentionally propagate to a remote area.

Note that the effect of the present embodiment is not limited to the micropumps 10 of the type shown in FIG. 1, but generally is effective for all the types of micropumps accompanying pulsation in liquid transfer.

Figure 4:
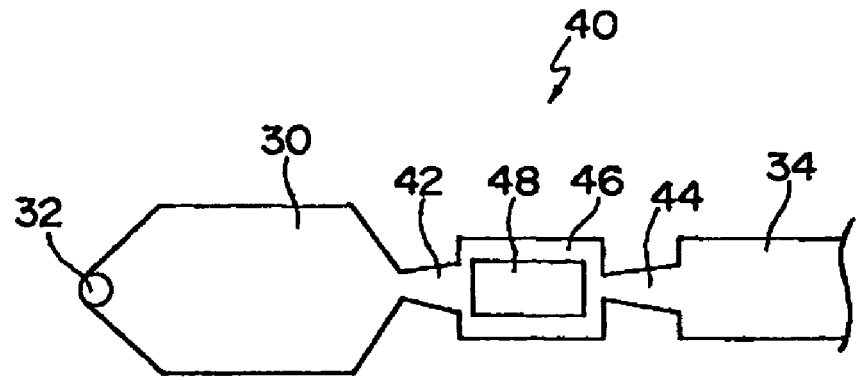
FIG. 4 is a plan view of a fluid transferring system of a second modification of the first embodiment.

For example, the effect of the present embodiment is especially effective for a valveless micropump such as a micropump 40 of a type called "nozzle/diffuser type," as shown in the top view of FIG. 4, having inlet/outlet 42 and 44 each having a widening shape as opening sections, and using a larger flow channel resistance in a widening direction at all times. The micropump 40 of FIG. 4, similar to the micropump 30 shown in FIGS. 1 and 2, a piezoelectric element 48 is AC driven to transfer a liquid in the chamber 46.

Figure 5A:
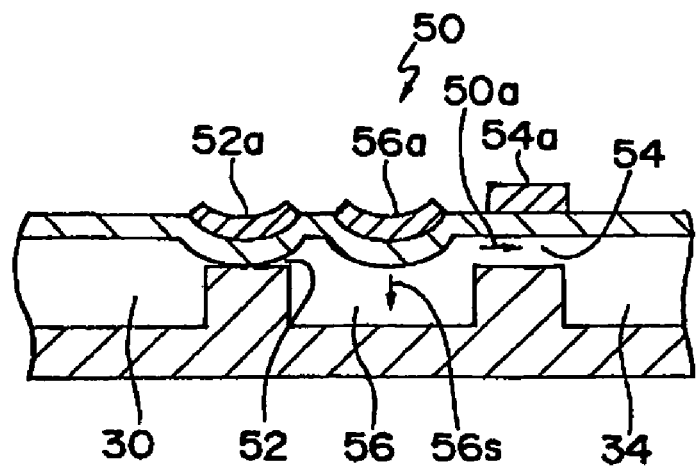
FIGS. 5(a) and (b) are sectional views of a micropump of a third modification of the first embodiment.
Figure 5B:
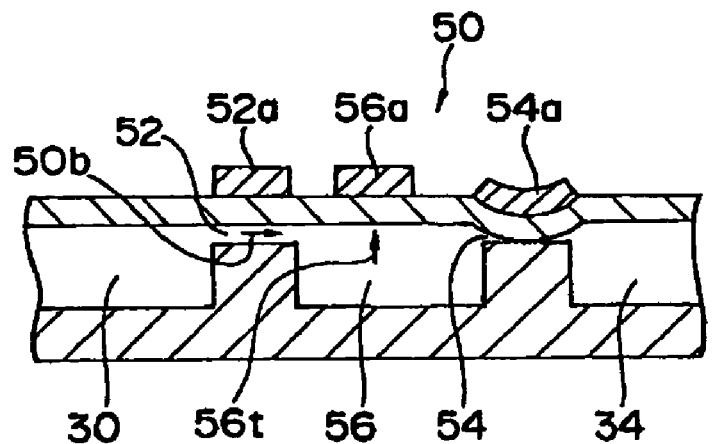

Furthermore, since in a micropump 50 of a type, as shown in a sectional view of FIGS. 5(a) and (b), in which a liquid is transferred in company with opening and closing of valves 52 and 54 as well, it is expected that in a driving at a higher velocity, a liquid transfer amount per one cycle is affected by pulsation with more of ease; therefore, the above effect is considered to be effective. A micropump 50 of FIGS. 5(a) and (b) drives at prescribed timings piezoelectric elements 52a and 54a opening or closing valves 52 and 54 in synchronization with a piezoelectric element 56a facing a chamber 56. For example, in a state where the valve 52 is closed as shown in FIG. 5(a), the chamber 56 is deformed to pressurize and to push out the liquid to the flow channel 34 from the chamber 56 as shown with an arrow mark 50a. Then, in a state where the valve 54 is closed as shown in FIG. 5(b), the chamber 56, as shown with an arrow mark 56t, is restored to an original state while reducing a pressure therein and to suck the liquid from the liquid reservoir 30 as shown with an arrow mark 50b. The operations are repeated thereafter.

Then, description will be given of the second embodiment with reference to FIGS. 6 to 8.

Figure 6:
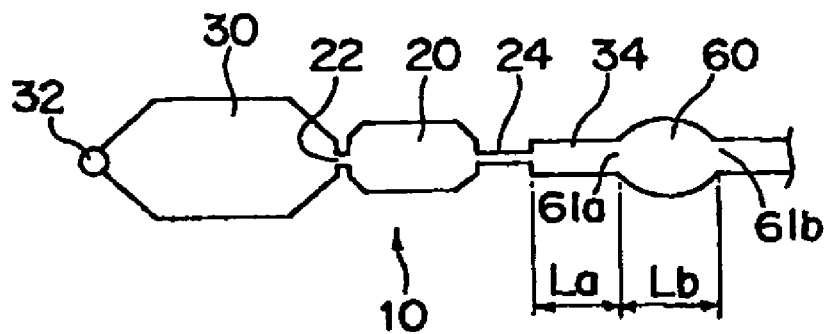
FIG. 6 is a plan view of a fluid transferring system of a second embodiment reflecting aspects of the present invention.

While a fluid transferring system shown in FIG. 6 is constructed in an almost similar way to the first embodiment shown in FIGS. 1 and 2, dissimilar to the first embodiment, a pressure absorbing section 60 is installed at some mid point of the flow channel 34 connected to the second opening section 24. The top wall of the pressure absorbing section 60 is made of thin plate 14, as in the first embodiment. Since a width of the pressure absorbing section 60 is wider than the flow channel 34, the thin plate 14 of a portion facing the pressure absorbing section 60 is deformed into deflection by a pressure with more of ease. A capacitance (Cd) of the pressure absorbing section 60 due to deformation of the thin plate 14 is proportional to a width w to the fifth power as shown in the equation (10), so the width wider by a percent of the order of, for example, 20% only, the capacitance increases by a factor of about 2.5-fold. While, in fact, the effect should be evaluated using the sum including a capacitance (Cw) due to compression of the liquid, there is a case where the widening to this level alone sufficiently works as a pressure absorbing section.

In this pressure absorbing section 60, not simply is a pressure absorbing effect is exerted, but there is available therein a characteristics to reflect a high frequency compressional wave. To be concrete, a reflection occurs in a position where an effective acoustic impedance changes such as the boundaries 61a and 61b between the flow channel 34 and the pressure absorbing section 60. Reflection can occur in not only a portion where an acoustic impedance increases, but also a portion where an acoustic impedance decreases.

If an acoustic impedance in a portion (portion of La) prior to a reflecting section 61a is Za and an acoustic impedance in a portion (portion of Lb) ahead of the reflecting section 61a is Zb by definition, a reflectance of a pressure K at the reflecting section 61a can be expressed by the following equation:

$$K = (Zb - Za)/(Za + Zb) \quad (12)$$

Note that an acoustic impedance value Z is obtained by the following equation:

$$Z=\sqrt{(M \times C)} \quad (13)$$

M and C herein are effective values of the inertance M and the acoustic capacitance C, respectively.

Note that it is only a high frequency vibration that can be reflected with this construction. A guide value of the frequency lower limit has to be a frequency, wavelengths ½-fold or more the a wavelength corresponding to which can reside in a region of the pressure absorbing section 60 when waves propagate in the pressure absorbing section. In other words, among frequencies when waves propagate in the pressure absorbing section 60, no reflection occurs of waves with wavelengths of two-fold or more the length (that is Lb) propagating a pressure through the pressure absorbing section 60 and reflection occurs on waves with wavelengths shorter than that.

That is, a component with frequencies of a prescribed frequency or higher becomes hard to propagate ahead of the pressure absorbing section, a flow of a liquid ahead of this portion can be a smooth flow without pulsation. As a result, even if there is a complex flow channel shape such as a sharp bend or a connecting section with an external flow channel or a indefinite factor such as mixing-in of air bubbles, stabilization of fluid transferring characteristic can be effectively realized without producing no reflection of waves hard to be controlled because of the shape or the factor.

There is a case where a reflected wave reflected at the pressure absorbing section 60 returns to the second opening section 24 of the micropump 20 to thereby affect an influence on a characteristic of the micropump 20. Generally, the influence results in deterioration in characteristic in more of cases. By performing a design taking into consideration a position of a wave front, however, a reflected wave can be intentionally used to the contrary to enable enhancement of efficiency. Especially, this effect is greatly exerted in the micropump 10 of the type shown in FIGS. 1 and 2.

That is, since in the micropump 10 of the above type, no change in flow channel resistance value in the second opening section 24 is required even if a pressure changes, a change in pressure across the second opening section 24 is desired to be the lowest possible level. Therefore, a reflected wave is used to cause the reflected wave having a phase difference from a pressure vibrational cycle wave form to interfere with the original wave in the second opening section 24 to thereby suppress fluctuation in pressure in the second opening section 24, thus enabling better characteristic to be obtained.

For the purpose, it is preferably required to find a distance La from the second opening section 24 to the pressure reflecting section 61a so that the distance La becomes the most suitable while avoiding a length in the vicinity of a length N(N=1, 2, 3, . . . ) times a half wavelength at which a wave of a driving cycle of the micropump 10 propagates a flow channel. As the N is larger, however, attenuation of the reflected wave increases; therefore reduction occurs in an effect of suppressing fluctuations in pressure with the reflected wave. Moreover, if a wavelength changes by a slight error in design and external disturbance, a phase of a reflected wave shifts, which could lead to a unexpected result different from a target altogether. Therefore, it is preferable that a distance La from the second opening section 24 to the pressure reflecting section 61a is set to be shorter than ½ times a wavelength of a driving cycle of the micropump 10 and furthermore to install the pressure reflecting section 61a at a position so as to make a phase of the reflected wave to be the most suitable.

Note that a length of a half wavelength to a driving cycle Tp of the micropump 10 is given in a similar way to the above equation (11) as follows:

$$Lh = Tp/\sqrt{(M \times C)} \quad (14)$$

Therefore, it is preferably required that a position (that is a length of La) of the pressure reflecting section 61a for the Lh is optimized, or Lh for a position of the pressure reflecting section 61a is optimized by changing a capacitance C of the pressure propagating flow channel (a portion of La) or an inertance M.

The, description of a first modification of the second embodiment is presented below with reference to FIG. 7.

Figure 7:
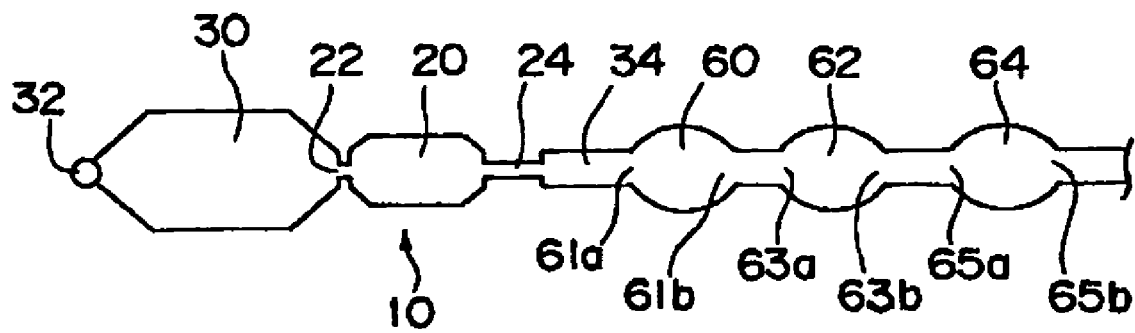
FIG. 7 is a plan view of a fluid transferring system of a first modification of the second embodiment.

A fluid transferring system of FIG. 7 is installed with pressure absorbing sections 60, 62 and 64 inserting with a spacing therebetween at plural positions in one flow channel 34. With such a construction applied, propagation of a high frequency component can be effectively prevented or suppressed. By installing the plural pressure absorbing sections 60, 62 and 64 in such a way, reflections at respective boundaries 61a, 61b, 63a, 63b, 65a and 65b are not required to be so intense as in a case of FIG. 6, therefore, a high frequency component propagating ahead of the pressure absorbing section 64 can be suppressed by reducing wave components reflecting back to the second opening section 24.

A pressure absorbing section may be of a construction other than FIGS. 6 and 7 and it is preferably required that there is a boundary at which an acoustic impedance Z is discontinuous.

Furthermore, such a reflection phenomenon can also be produced in a portion where straight propagation of a pressure wave is hindered such as a portion where a flow channel suddenly bends regardless of a value of an acoustic impedance, such a portion can also used for a similar purpose.

Figure 8:
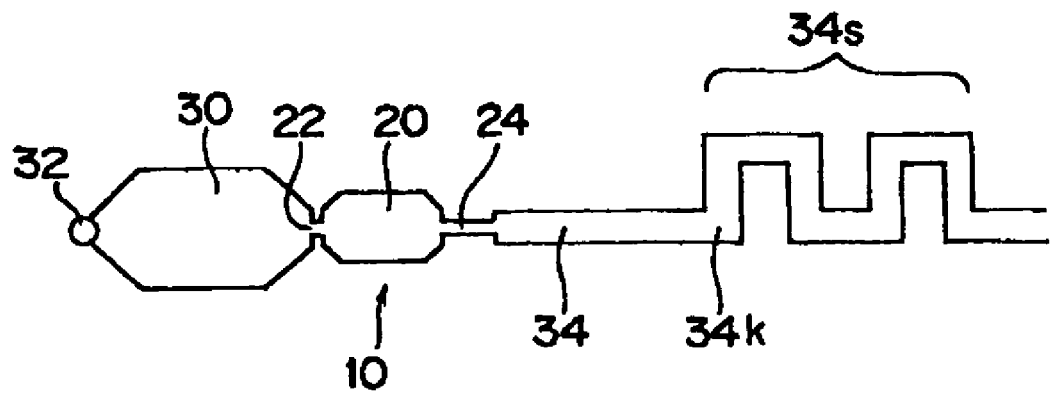
FIG. 8 is a plan view of a fluid transferring system of a second modification of the second embodiment.

For example, in a fluid transferring system of FIG. 8, plural bent sections 34k can be provided in a portion 34s ahead of the flow channel 34 to thereby enable part of a high frequency wave to be reflected in the bent sections 34k.

Then, description will be given of a third embodiment with reference to FIGS. 9 to 16.

A plurality of micropumps such as those in the first and second embodiments are arranged and the micrpumps are connected into a system to thereby enable a characteristic as a system to be improved more than when one micropump is single used. In a case where such a way of use is adopted, it is possible that a micropump receives no influence of pulsation from the other micropumps and to the contrary, by mutually using pulsation of individual micropumps, the combination of micropumps is of higher performance.

Figure 9:
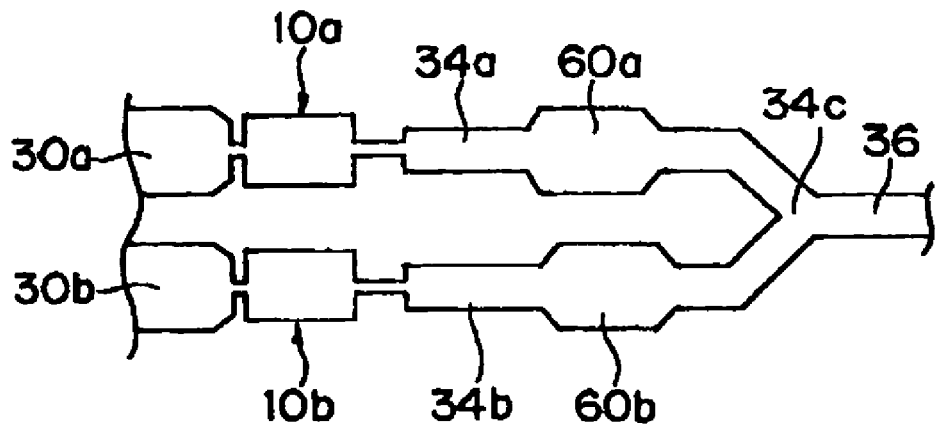
FIG. 9 is a plan view of a fluid transferring system of a third embodiment reflecting aspects of the present invention.

In a fluid transferring system shown in FIG. 9, micropumps 10a and 10b connected to respective liquid chambers 30a and 30b are arranged to construct parallel lines and to increase a flow rate as a system. At this time, in order to prevent occurrence of unexpected inconvenience at merging section 34c by influences of mutual pulsation of the micropumps 10a and 10b and a change in characteristic of a flow in a flow channel 36 after the merging, pressure absorbing sections 60a and 60b are respectively installed at some mid points in the flow channels 34a and 34b connected to the micropumps 10a and 10b.

Figure 10:
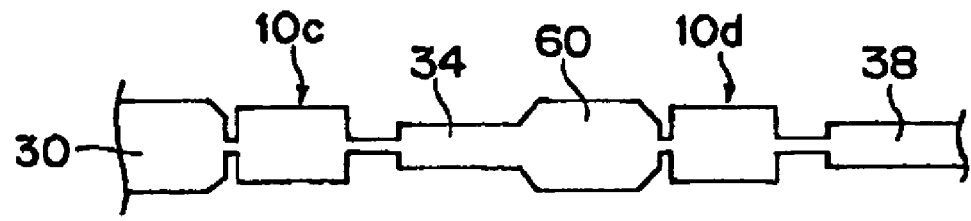
FIG. 10 is a plan view of a fluid transferring system of a first modification of the third embodiment.
Figure 11:
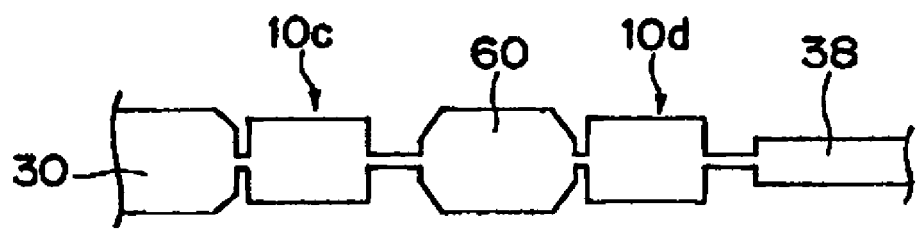
FIG. 11 is a plan view of a fluid transferring system of a second modification of the third embodiment.

Fluid transferring systems of FIGS. 10 and 11 have a plurality of micropumps 10c and 10d connected in series between the liquid chamber 30 and the flow channel 38 to thereby, increase a generated pressure as a system. At this time, it is predicted that an interference of pressure waves occurs between the micropumps 10c and 10d by influences of mutual pulsation of the micropumps 10c and 10d to thereby, disable a desired characteristic to be obtained. In order to prevent this, in the fluid transferring system of FIG. 10, a pressure absorbing section 60 is installed in the flow channel 34 connecting the chambers of the respective micropumps 10c and 10d therebetween. In the fluid transferring system of FIG. 11, only the pressure absorbing section 60 is installed between the micropumps 10c and 10d without a flow channel. This method can be used to all micropumps of any types having pulsation, not limited to the micropump of the type of FIG. 1.

In a case where plural micropumps are connected in series, there is a method in which pressure waves of the respective micropumps are used by each other to raise characteristics thereof in addition to alleviate pulsating pressures. The example of the method will be shown below.

Figure 12:
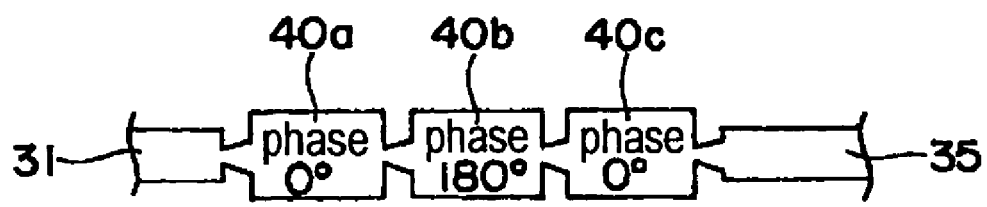
FIG. 12 is a plan view of a fluid transferring system of a third modification of the third embodiment.

In a fluid transferring system of FIG. 12, chambers of plural micropumps 40a, 40b and 40c are connected in series between flow channels 31 and 35 (no problem occurs if the chambers are connected through flow channels) and phase differences are imparted between adjacent micropumps 40a, 40b and 40c (or shifting timings of respective driving voltages), in which situation, the micropumps are driven.

Figure 13A:
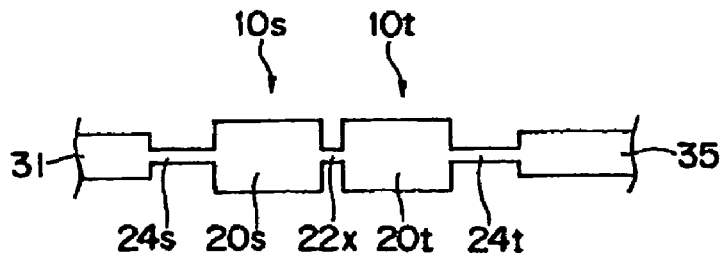
FIGS. 13(a) and 13(b) are a plan view and driving voltage waveforms of a fluid transferring system of a fourth modification of the third embodiment.
Figure 13B:
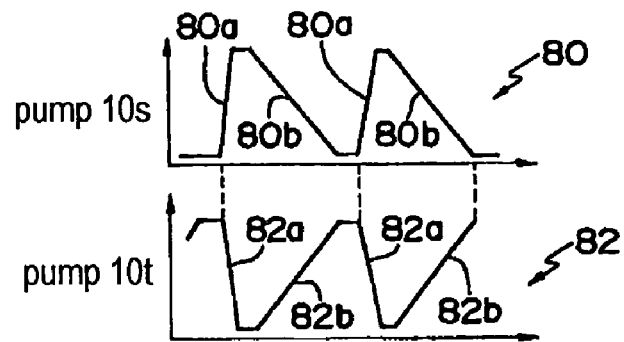

In FIG. 13(a), there is shown a fluid transferring system of a construction in which two micropumps of the type shown in FIGS. 1 and 2 are installed in series with each other. In this system, to be concrete, chambers 20s and 20t of two micropumps 10s and 10t are connected by a common first opening section 22x therebetween and the other sides of the chambers 20s and 20t are connected to flow channels 31 and 35 through second opening sections 24s and 24t. The micropumps 10s and 10t are properly driven so that a behavior of an actuator causes the micropumps 10s and 10t to have a phase difference therebetween (or a polarity, positive or negative in a deformation direction is reversed to negative or positive). For instance, FIG. 13(b) is examples of driving voltage waveforms 80 and 82 applied to the respective actuators (not shown in FIG. 13(a)) of the micropumps 10s and 10t. Driving voltage waveforms 80 and 82 are synchronized between a steep rise 80a and a steep fall 82a and between a mild fall 80b and mild rise 82b and phases between waveforms of both micropumps 10a and 10t are shifted by 180 degrees.

Figure 14A:
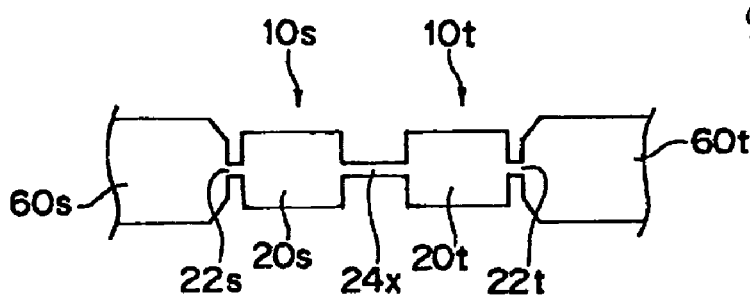
FIGS. 14(a) and 14(b) are a plan view and driving voltage waveforms of a fluid transferring system of a fifth modification of the third embodiment.
Figure 14B:
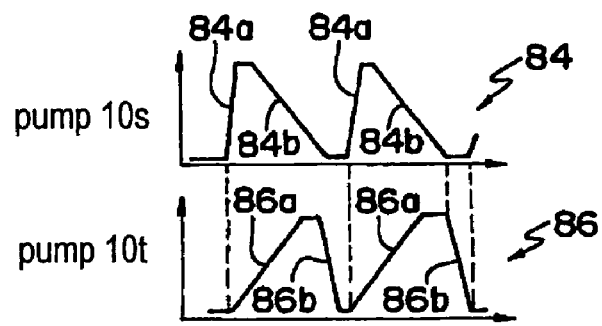

FIG. 14(a) is a fluid transferring system with a fifth modification of the third embodiment in which chambers 20s and 20t of micropumps 10s and 10t of the type of FIG. 1 are connected by a common second opening section 24x, and first opening section 22s and 22t on the other sides of the chambers 20s and 20t are connected to flow channels not shown through pressure absorbing section 60s and 60t. In this case, the pressure absorbing section 60s and 60t are desirably installed from the viewpoint of a sable characteristic. FIG. 14(b) are examples of driving voltage waveforms 84 and 86 applied to actuators (not shown in FIG. 14(a)) of the micropumps 10s and 10t. The actuators of the micropumps 10s and 10t have respective different rise times (lengths of 84a and 86a) and respective different fall times (lengths of 84b and 86b) and in the rises and falls of the waveforms, when a displacement velocity of one of the actuators is the fastest, directions of displacement of both actuators coincide with each other.

In a fluid transferring system of FIG. 15, which is a sixth modification of the third embodiment, plural micropumps 40s and 40t are connected in series between flow channels 31 and 35 through a flow channel 33, which is a connection section. By setting a length $L_0$ of the flow channel 33 to a proper value, pulsations produced by the micropumps 40s and 40t can be used by each others with respect of a wavelength of a pressure compressional wave propagating through the flow channel 33.

As described above, it is preferably required that the length $L_0$ of the flow channel 33 may be set so that a pressure compressional wave propagating from one micropump to the other pump and a reflected wave cancel each other avoiding values in the vicinity of N(N=1, 2, . . . ) times a half wavelength of the pressure compressional wave. When a length $L_0$ of a flow channel 33 is ½-fold or less the wavelength of a pressure compressional wave, attenuation of a reflected wave is small; therefore not only does a canceling effect increase, but a target result can also be achieved even if design error, manufacturing error, external disturbance or the like occurs.

If the flow channel 33 is excessively short, however, the effect cannot be attained and what's worse a possibility arises that an adverse influence is exerted. In a sine wave, which is the most popular pressure compressional wave, a length from a position of a peaked pressure to a position where a pressure is zero corresponds to a length ¼ times the wavelength and in a case of the length or less, so much of the effect cannot be expected and to the contrary, an adverse effect is likely to be exerted. Therefore, a length $L_0$ of the flow channel 33 is desirably equal to or more than ¼ times the wavelength of a vibration with a driving frequency.

With any combination of the above various contrivances applied, a fluid transferring system with higher performance can be constructed.

For example, a fluid transferring system of FIG. 16 (seventh modification of third embodiment) is constructed of three parallel lines each including a first micropump, a first flow channel containing a first pressure absorbing section, a second micropump and a second flow channel connected in the order between a liquid reservoir 30x and a second pressure absorbing section 60x, wherein the three first micropumps are indicated with 10u, 10v and 10w; the three first flow channels with 34u, 34v and 34w; the three pressure absorbing sections with 60u, 60v and 60w; the three second micropumps with 10x, 10y and 10z; and the three second flow channels with 34x, 34v and 34w. By merging the lines in each of which constituents are connected in series but the whole of which are connected in parallel, a flow rate and a generated pressure of the flow channel 36 after the merging can be increased.

As described above, a fluid transferring system can prevent its characteristic from deteriorating by installing a pressure absorbing section, a reflecting section and others therein.

Then, description will be given of the first modification example of the first embodiment described in FIG. 3 in a more detailed manner. Since the micropump 10 shown in FIG. 1 realizes a pumping action by using a difference in flow channel characteristic between the two opening sections 22 and 24, a pump having a larger difference in flow channel characteristic obtains a larger flow rate with a better efficiency. That is, the one opening section 22 is better in efficiency with the largest possible differential pressure dependency while the other opening section 24 is better with a smaller differential pressure dependency.

Therefore, in the first modification of the first embodiment, the fluid transferring system is constructed using the opening section 24 small in differential pressure dependency as an opening section group (or a group of sub-opening sections). That is, the opening section group 24 includes the two sub-opening sections 24a and 24b provided in parallel to each other and the flow channel 34 communicates with the chamber 20 through the two opening sections 24a and 24b.

The micropump of this modification is also driven by an actuator of a monomorphic structure including the piezoelectric element 16 and the thin plate 14. A voltage of a waveform shown in FIG. 20(a) or FIG. 21(a) is applied to the piezoelectric element 34 by the driving circuit 18 to thereby bend and deform the actuator and to increase or decrease a volume of the chamber 11.

An effective sectional area of the opening section 22 is smaller than an effective sectional area of the reservoir 30. Furthermore, effective sectional areas of the respective opening sections 24a and 24b are smaller than that of the flow channel 34. A change ratio as a whole in flow channel resistance of the opening section group 24 when a pressure in the chamber 20 is raised or lowered is set to a value smaller than that of the opening section 22.

That is, while the opening section group 24 is constituted of the two opening sections 24a and 24b, the opening sections 24a and 24b are equal in aspects of a length, a sectional shape and an effective sectional area to each other. Therefore, to simply consider the construction, a flow channel resistance is halved compared to the case one of the opening sections 24a and 24b is used.

By comparison with the micropump 10 of the first embodiment, the first modification of the first embodiment can be regarded as a micropump of a construction in which the two opening sections 24a and 24b each with the same sectional shape as the single opening section 24 are provided instead of the single opening section 24 and a length of the opening sections 24a and 24b are increased (to, for example, the order of a value twice) so as not to reduce a flow channel resistance as a whole.

Figure 22A:
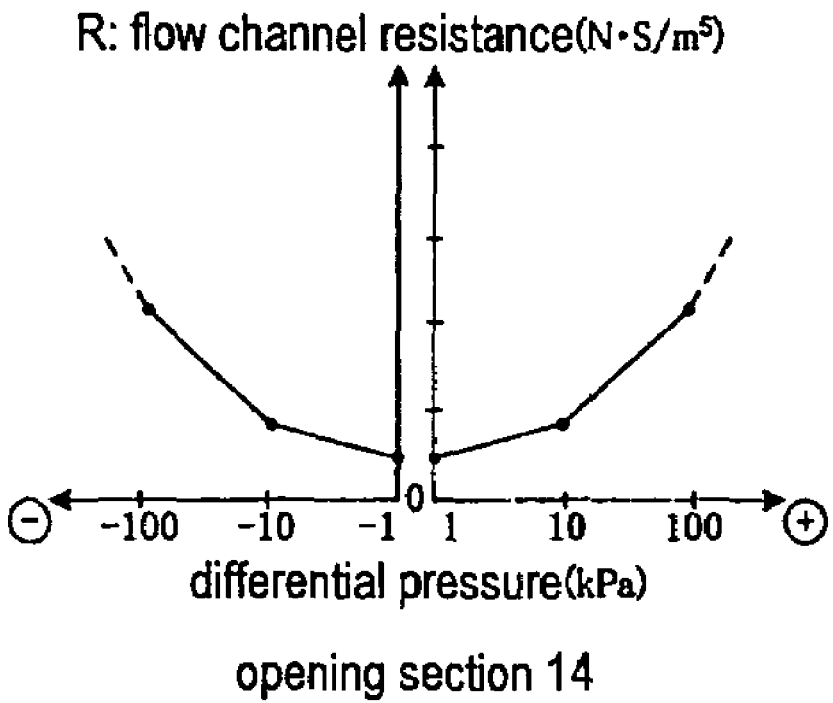
FIG. 22(a) and FIG. 22(b) are graphs showing examples of flow channel resistance characteristics at an opening sections.
Figure 22B:
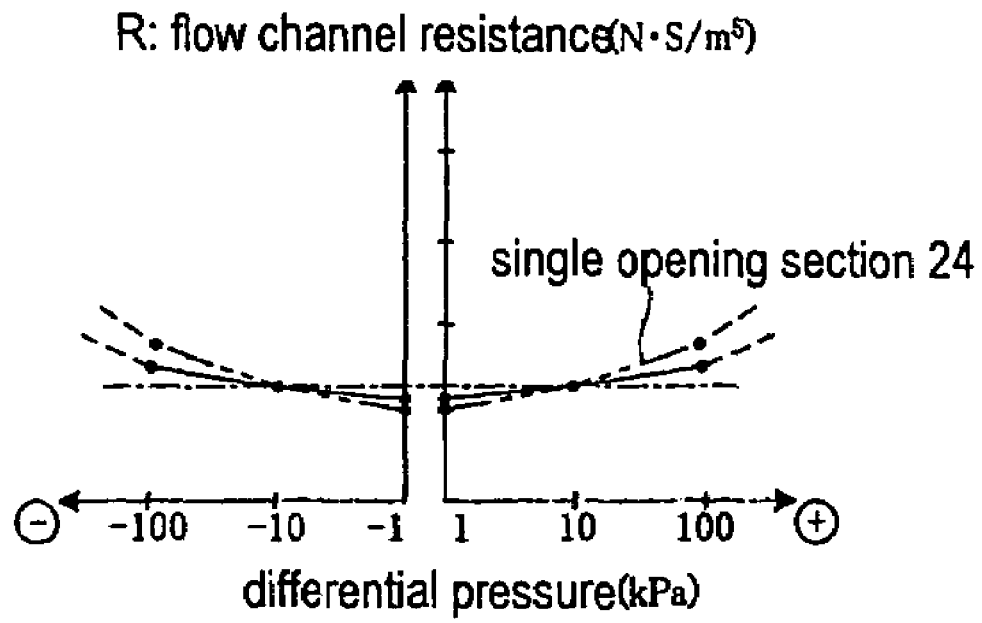

Therefore, as shown in FIG. 22(a), the opening section 22 shows a low flow channel resistance when a difference between pressures at both ends is close to zero while showing a higher flow channel resistance when a larger difference between pressures. That is, the differential pressure dependency of the flow channel resistance is high. The opening section group 24, as shown in FIG. 22(b), shows a flow resistance higher than in the case of the opening section 22 when the differential pressure is close to zero, but the flow channel resistance has nearly no differential pressure dependency, no much change in flow channel resistance occurs even when the differential pressure is large and the flow channel resistance is smaller than that in the opening section 22 when the differential pressure is large.

Such a flow channel resistance characteristic can be attained by adopting a condition that a fluid, that is a liquid, flowing in a flow channel assumes a laminar flow or a turbulent flow according to a differential pressure, or alternatively, assumes a laminar flow at all times regardless of a differential pressure. To be concrete, the condition can be realized in the construction in which in the former case, for example, the opening section 22 is a short orifice in a flow channel length and in the latter case, the opening sections 24a and 24b are long nozzles in a flow channel length.

By using such flow channel resistance characteristics of the opening section 22 and the opening section group 24 not only to generate a pressure in the chamber 20 but also to control a change ratio in the pressure, a pumping action can be realized that more of a fluid is discharged into or taken in from the opening section 22 or the opening section group 24, whichever is lower in flow channel resistance, in a discharge step and an intake step.

That is, as a pressure in the chamber 20 is raised with the large pressure change rate (or the fast change in pressure), the differential pressure increases to cause a flow channel resistance of the opening sections 22 to become larger than that of the opening section group 24 and to thereby discharge almost all the fluid in the chamber 20 through the opening section group 24 (discharge step). As pressure in the chamber 20 is lowered with the small pressure change rate (or the slow change in pressure), the differential pressure is maintained small to cause a flow channel resistance of the opening section 22 to become smaller than that of the opening section group 24 and to thereby cause more of a fluid to be taken into the chamber 20 from the opening section 22 (intake step).

Contrary to this, as a pressure in the chamber 20 raised with small pressure change rate, the differential pressure is maintained small to cause a flow channel resistance of the opening section 22 to be smaller than that of the flow channel section group 24 to thereby cause more of a fluid in the chamber 20 to be discharged from the opening section 22 (discharge step). As a pressure in the chamber 20 lowered with large pressure change rate, the differential pressure is increased, to cause a flow channel resistance of the opening section 22 to become larger than that of the opening section group 24 to thereby cause more of a fluid to be taken into the chamber 20 from the opening section group 24 (intake step).

Such a pressure control of the chamber 20 is realized by controlling a driving voltage supplied to the piezoelectric element 16 to further adjust a deformation amount of a diaphragm and a timing. For example, by applying a driving voltage of the waveform shown in FIG. 20(a) to the piezoelectric element 16, a fluid is discharged into the flow channel 34 side while by applying a driving voltage of the waveform shown in FIG. 21(a), a fluid is discharged into the reservoir 30 side.

In the FIGS. 20(a) and 20(b), and FIGS. 21(a) and 21(b), the maximum voltage e1 applied to the piezoelectric element 16 is on the order in the range of from several volts to tens of volts or on the order of 100 volts at the highest. Times T1 and T7 are on the order of 20 μs, times T2 and T6 is in the range from 0 to several μs and times T3 and T5 are on the order of 60 μs. Times T4 and T8 may be 0. A frequency of a driving voltage is on the order of 11 kHz. In the flow channel 34, for example, flow rates as shown in FIG. 20(b) and FIG. 21(b) are obtained according to the driving voltages shown in FIG. 20(a) and FIG. 21(a). Note that flow rate curves in FIG. 20(b) and FIG. 21(b) are those shown as a model of flow rates obtained by a pumping action and an inertia vibration of a fluid is actually superimposed thereon. Accordingly, these flow rate curves shown in the figures on which vibrational components are superimposed give flow rates that would be actually obtained.

Focusing again attention on FIG. 22 (b), a two-dot chain line shown in the same figure is flow channel resistance characteristics of the opening section 24 in the construction of FIG. 1. By comparison with a flow resistance characteristic in the construction of the first embodiment, the opening section group 24 of this modification is understood to be small in pressure dependency of flow channel resistance. That is, by giving consideration to this together with FIG. 22(a), in a case where the differential pressure is in the range of from −100 kPa to +100 kPa, it is understood that a flow channel resistance of the opening section group 24 is larger when a value (in the absolute value) of the differential pressure is small while a flow channel resistance of the opening section group 22 is larger when a value of the differential pressure is larger. In addition, a difference in flow channel resistance is larger in any case as compared to a case where the opening section 24 in the construction of FIG. 1.

Therefore, according to the micropump 1 of this modification, a flow rate larger with a better efficiency (a flow rate efficiency) than in the case of the first embodiment by a change in difference in flow channel resistance.

Then, description will be given of a reason for reduction in pressure dependency due to the use of the plurality of the opening sections, which is not obtainable from a single opening section. The "flow channel resistance" described above, corresponds to a pressure loss coefficient. A flow channel resistance R [N·s/m$^5$] is given by the following formula if a volume (a flow rate) flowing in a unit time is Q, a pressure loss caused by a flow of a fluid is ΔP by definition:

$$R = \Delta P/Q \quad (1)$$

Herein, N is a force (in units of Newton) and s is a time (in units of second).

Note that the terms "a flow channel resistance of an opening section" or "a flow channel resistance of an opening section group" are a value of a flow channel resistance when a fluid flows forward or backward between a flow channel and a chamber between which the opening section or the opening section group communicates and includes a flow channel resistance caused by a flow in the vicinity of an inlet/outlet of the opening section or the opening section group.

Therefore, in cases where a portion in which a flow velocity is faster than a peripheral region thereof or where a turbulent flow occurs in the vicinity of the inlet/outlet, flow channel resistance of the portions should be considered as components of the "flow channel resistance of the opening section." Note that in the following description, since an opening section and an opening section group are a kind of a flow channel, those are also described as "flow channels."

As described above, generally speaking, a state in which no change occurs in flow channel resistance even if a change occurs in differential pressure between the inlet and outlet of a flow channel (or a flow velocity in the flow channel) is a characteristic in a case where a laminar flow is sufficiently grown.

Contrary to this, a state in which an increase in flow channel resistance occurs with an increase in differential pressure between the inlet and outlet of a flow channel is a characteristic of a turbulent flow. To be more exact, it can be said a characteristic in a case where formation of a laminar flow is insufficient.

In general, while a fluid shows a behavior of a laminar flow in the interior of a thin, long flow channel, a flow channel resistance includes components from behaviors of a turbulent flow (or a flow that is not grown enough to be a laminar flow) in the vicinity of each of the inlet and outlet of the flow channel.

Herein, in a case where consideration is given to a thin, long opening section with a length, a value Ra of a flow channel resistance is the sum of an invariable component R1 independently of the differential pressure and a component R2 increasing with the differential pressure, that is expressed by the following formula:

$$Ra = R1 + R2 \quad (2)$$

R1 is a component proportional to a flow channel length L and R2 is a characteristic associated with both ends and a component independent of the flow channel length L.

Figure 23:
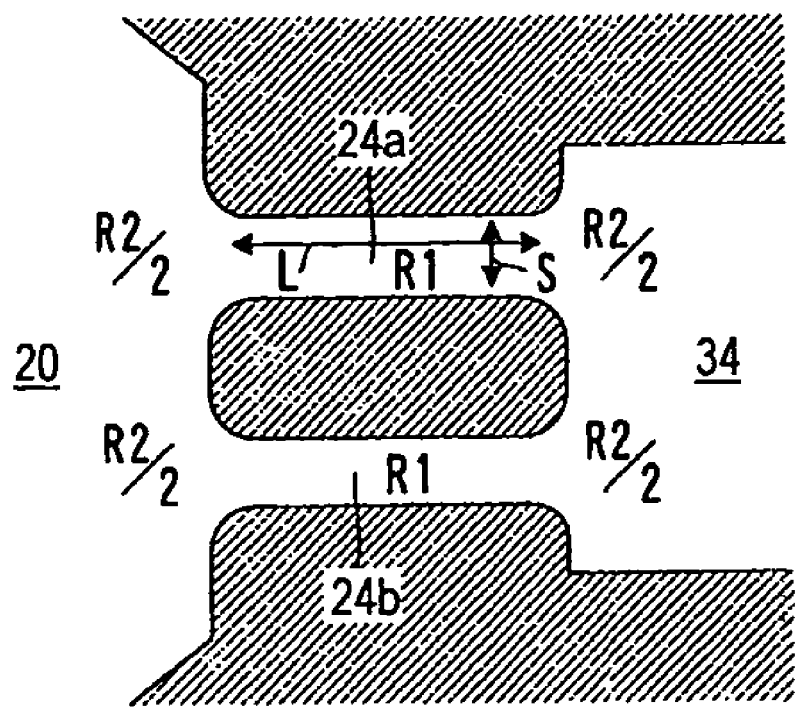
FIG. 23 is an enlarged view showing an opening section group 24 of a micropump.

As shown in FIG. 23, in the opening sections 24a and 24b, a component caused by a portion with a uniform sectional shape is R1 and a component caused by both end portions works is R2.

On the other hand, a value Rb of a flow channel resistance of an opening section N times a length of the opening section is given by the following formula:

$$Rb = N \times R1 + R2 \quad (3)$$

That is, only the component R1 which is proportional to a flow channel length L grows to be N times larger. The meaning of the growth of the component R1 is that only the component R1 invariable independently of the differential pressure is N times larger and no change arises in the component R2 increasing with the differential pressure.

Plural flow channels in number of N are arranged in parallel to each other, a value Rc as a whole of flow channel resistance is given by the following formula, which is deduced by dividing the above formula (3) by N:

$$Rc = R1 + R2/N \quad (4)$$

As can be understood by comparison between the formulae (2) and (4), the invariable components R1 independently of the differential pressure are equal therebetween but the component R2 increasing with the differential pressure, in a case where N flow channels are arranged in parallel to each other, is 1/N times that in the case of a single flow channel, which decreases with an increased N number of flow channel connected in parallel to each other.

Figure 24:
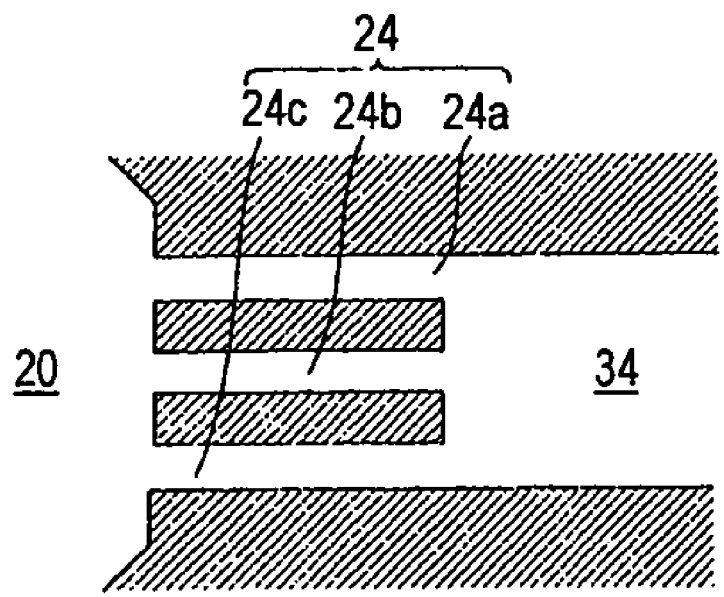
FIG. 24 is a view showing an example of an opening section group 24 provided with three opening sections.

For example, in the above micropump 1, a flow channel resistance is halved and in the example shown in FIG. 24, a flow channel resistance is to be one-third.

As a result, with an increased number N of flow channels connected in parallel to each other, a change ratio in flow channel resistance decreases when the differential pressure changes, while improvement occurs on flow rate characteristic as a pump since a difference in pressure dependency increases compared with the other flow channels.

In such a way, with an increased number N, an efficiency becomes better in principle, while no differential pressure arises if the number N becomes a certain level or larger, so the numbers of N are determined considering a level at which an opening section is fabricated with ease.

Then, there are shown concrete examples of dimensions of sections.

The opening section 22 is on the order of 25 μm in width and on the order of 25 μm in length. The opening sections 24a and 24b are on the order of 36 μm in width and on the order of 400 μm in length. A depth of the opening section 22 and the opening sections 24a and 24b are all on the order of 25 μm and all have a uniform section shape (a section of a flow channel) in the length direction thereof (a direction of a flow of a fluid).

Note that, on this occasion, a value of L/S, that is [a flow channel length/a sectional area] (in units of $\mu m^{-1}$) is 0.04 in the opening section 22 while being a value as large as 0.44 in the opening sections 24a and 24b both.

While a letter L used here is a length of a flow channel of an opening section, a case arises where which length is a proper one is not clear according to shapes of both ends of the opening section. In this case, experiments have only to be conducted concerning opening sections with various kinds of shapes to find equivalent flow channel lengths of the actual opening sections based on results of the experiments and to use the equivalent flow channel lengths as effective flow channel lengths. This is also true for a sectional area S.

Here, for a reference, comparison is performed with a construction in which a second opening section is one narrow small flow channel. In this case, if it is assumed that a width of a second opening section is on the order of 36 μm and a length is on the order of 180 μm, a value of a flow channel resistance is altered in the range of 7.6 to 15.9 ($\times 10^{12}$ N·s/m$^5$) under a differential pressure in the range 1 kPa to 100 kPa.

In contrast to this, a change in flow channel resistance is in the range of from 7.6 to 11.1 ($\times 10^{12}$ N·s/m$^5$) in a case where the opening section group 24 according to the modification described above; thereby enabling decrease in a range of a change to a half or less.

Note that the reservoir 30 and the flow channel 34 may also be a flow channel in a literal sense in order that a fluid is caused to flow through and guided to a prescribed position and a chamber to conduct a reaction with a fluid, or alternatively, a something like a reservoir to store a fluid. In the following description of the present specification, both are also collectively referred to "a flow channel."

As described partly above, the three opening sections 24a, 24b and 24c may be provided as the opening section group 24 as shown in FIG. 24. In this case, sectional areas of the opening sections 24a, 24b and 24c may be handled as a case of a single opening section with a length three times a length of each opening section 24a, 24b or 24c. Furthermore, flow channels each constituting an opening section group including plural opening sections can be merged therebetween into one flow channel having opening section groups each including plural opening sections.

Figure 25:
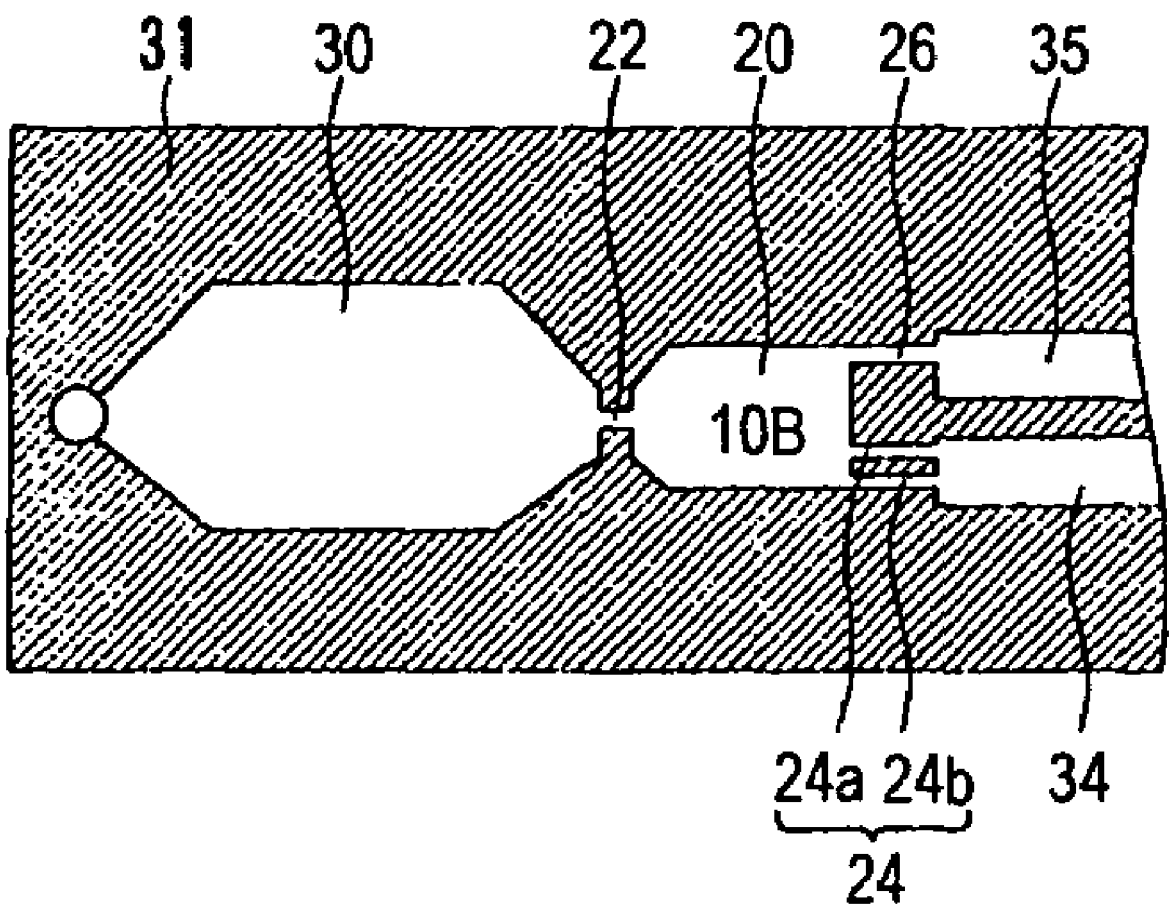
FIG. 25 is a model plan view showing a construction of a third modification of the first embodiment of the present invention.

Then, description will be given below of another construction of the first modification as a third modification of the first embodiment. FIG. 25 is a model plan view showing a construction of a fluid transferring system of a third modification relating to the first embodiment. In this modification, constituents with the same functions as those of the first modification of the first embodiment are attached with the same symbols and any of descriptions of the constituents is omitted for simplification.

In this modification, a micropump 10B has a third opening section 26 additionally and the opening section 26 is connected to the flow channel 35. A flow channel resistance characteristic of the opening section 26 can be set in various ways. For example, it may be designed so as to have the same dimensional shape as the single opening section 24a to thereby adopt the same flow resistance characteristic as the opening section 24a. Furthermore, it may be designed so as to have a sectional shape larger than the single opening section 24a but the same length to thereby give a flow resistance characteristic analogous to the flow channel resistance characteristic shown with a two-dot chain line in FIG. 22(b). Moreover, it may be designed so as to have the same dimensional shape as the opening section 22 to thereby give the same flow channel resistance characteristic as the opening section 22.

In the micropump 10B of this modification as well, a good flow rate efficiency can be achieved because of a difference in flow resistance characteristic between the opening section group 13 and the opening section 12.

In addition thereto, a working is enabled that a fluid is discharged into the flow channel 35 or is taken in from the flow channel 35 according to a flow channel resistance characteristic of the third opening section 26. On this occasion, a working is enabled that one of discharging and intake is conducted and in addition, ratios in flow rate ratio therebetween are controlled according to flow resistance characteristics of the opening section 22, the opening section group 24 and the opening section 26, respectively. In this case, the micropump 10B can be used as a mixer of fluids or a flow divider thereof.

Furthermore, a construction may be adopted in which an opening section group including two opening sections arranged in parallel to each other replaces the opening section 26. Especially in a case where the opening section groups 24 and 26 are both small in change ratio in flow channel resistance between pressures, the flow channels 34 and 35 can secure stable flow rate ratios (discharge ratios or intake ratios) thereof at all times even when a driving condition fluctuates or a driving voltage is altered. Accordingly, a merit is exerted that dividing of a flow or mixing of flows both at a stable ratio can be assured. Four or more opening sections and flow channels may be connected to the chamber 20.

In the second modification described above, the opening section 22 larger in differential pressure dependency may also be an opening section group including plural opening sections.

While in the embodiments and modifications thereof, plural flow channels are connected to the single chamber 20, all or part of the plural flow channels may be used as a flow channel in a circulating system. Furthermore, flow channels thereof may be merged at downstream position remote from the chamber 20. In that case as well, the merged flow channels is handled not as a single flow channel, but may be handled as flow channels as originally connected individually to the chamber 20.

While in the first, second and second modifications relating to the first embodiment, there is shown examples in which the micropumps 10 and 10B are fabricated using silicon substrates, the micropumps 10 and 10B may also be microfabricated from a material such as a resin, glass, a metal, a ceramic or the like. The diaphragm 15 is formed not by half etching but by laminating a thin plate separately prepared. In the latter case, any material may be used but a caution is required to be taken since a possibility exists that no sufficient displacement characteristic can be attained if the material is extremely softer than a piezoelectric element. Furthermore, while a depth of the chamber 20 is set to be the same as that of an opening section, no necessity arises for being the same but a depth of the chamber 20 may be deeper or shallower than that of the opening section. A deformation of the piezoelectric element 16, serving as an actuator increasing or decreasing a volume of the chamber 20, has no inevitability to be a unimorphic bending deformation, but may also be, for example, a vertical vibration, a lateral vibration, a shear deformation oscillation or the like. As the actuator, no specific limitation is placed on the piezoelectric element 16, but any of materials such as an electrostatic actuator, an electromagnetic actuator or a shape-memory alloy can be used as far as the materials can increase or decrease a volume of the chamber 20. Furthermore, the actuator is not integrated with the micropump 10 or 10B into one piece, but may be separable as a different identity.

Though a shape of an opening section is said to be uniform in flow channel section, no necessity arises for a perfectly uniform section. In other wards, a uniform sectional shape is not necessary required. For example, there are allowed the presence of projections and depressions or tapers at some level on the inner surface. A practical sectional area or an effective sectional area S in each of the cases can be obtained based on experimental values or calculated values. A widening portion with some extent area or a smoothly widening edge-rounded portion can be allowed in the vicinity of the inlet/outlet of an opening section, especially in an opening section on the discharge (outlet) side. Moreover, in an opening section in the side serving as the intake port (inlet), no function changes to a great extent even without a uniform sectional shape. To sum up, flow channel resistance characteristics for a pressure change of opening sections interposed in respective flow channels are different from each other and it is preferably required that a flow channel resistance characteristic of an opening section of a flow channel in which a pumping action is desired to obtain, is different as largely as possible from the others. A fluid that can be applicable may be a liquid, a fluid, a gas or the like.

While in the first, second and third modifications of the first embodiment described above, a driving voltage of an approximate triangular waveform is applied to the piezoelectric element 34, it is possible to use a driving voltage of one of various other kinds of waveforms. Moreover, a shape of a plan view of the micropump 1 or 10B can assume a square, a rectangle, a polygon, a circle, an ellipse and various other kinds of shapes. In addition thereto, the whole or parts of a micropump can be properly altered according to the spirit and scope of the present invention in aspects of a structure, a shape, a dimension, the number, a material and others.

For example, the present invention is not limited to a case where two flow channels communicating with a chamber of a micropump, but a case may be adopted where three or more independent flow channels communicate with a micropump as described in connection with the third modification of the first embodiment. In this regard, a fourth embodiment of the present invention will be described below.

Figure 26:
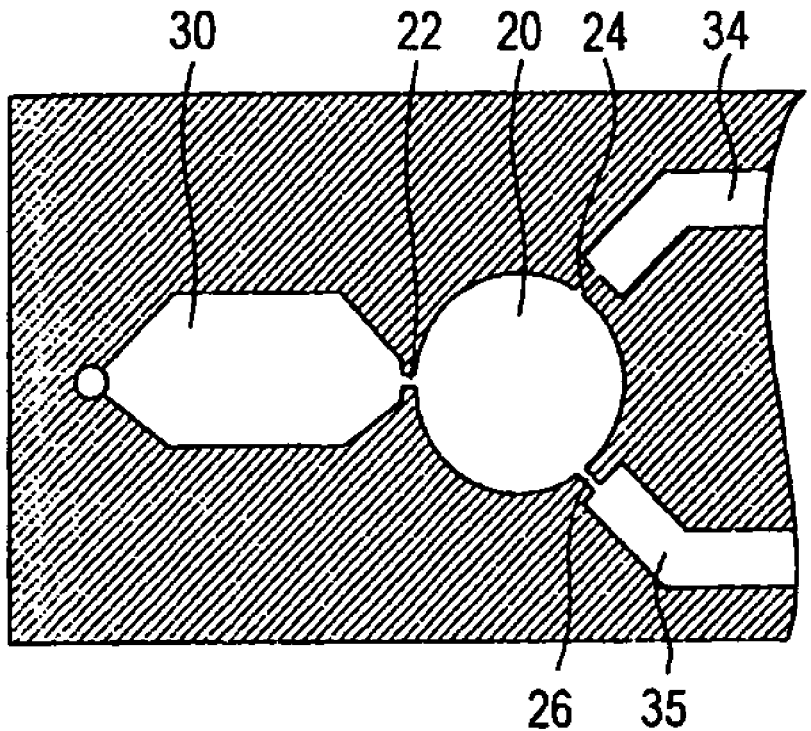
FIG. 26 and FIG. 27 are a model plan view and a model front sectional view showing a construction of a fluid transferring system of a fourth embodiment of the present invention.
Figure 27:
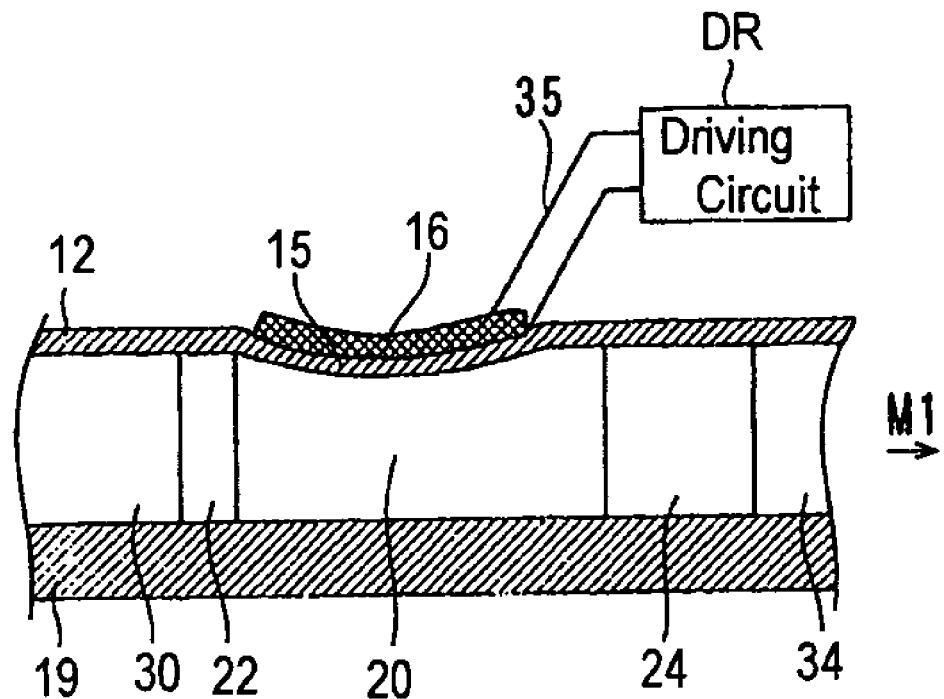

FIG. 26 and FIG. 27 are a schematic plan view and a schematic front sectional view showing a construction of a micro-fluid transferring system of a fourth embodiment of the present invention, FIG. 28 is a graph showing a flow channel resistance characteristic of each opening section, FIG. 29 and FIG. 30 are graphs showing example waveforms of a driving voltage of a piezoelectric element and FIG. 31 is a graph showing a way of change in volume of the chamber 20 according to a driving voltage. Note that FIG. 27 shows a section taken in plane passing through the centers of a reservoir 30, an opening section 22, a chamber 20, an opening section 24 and a flow channel 34 of FIG. 26.

The micro-fluid transferring system, as shown in FIG. 26 and FIG. 27, includes: a chamber 20, which is a pump room; first, second and third flow channels 22, 23 and 24, whose number is 3 in total, connected to the chamber 20; and first, second and third opening sections 22, 24 and 26 provided to flow channels 30, 34 and 35 in order to reduce flow channel sections thereof.

The micro-fluid transferring system, as well shown in FIG. 27, is fabricated in a procedure in which a silicon substrate 12 is used, the following grooves and recesses are formed in a photolithographic step: such as the chamber 20, the opening sections 22, 24 and 26 and flow channels 30, 34 and 35 and others and a glass substrate 19 serving as a base plate is adhered to the lower surface of the silicon substrate 12. On this occasion, a recess serving as the chamber 20 in the silicon substrate 12 is obtained by half-etching the silicon substrate 12 so as not to be etched therethrough and the rest portion of the silicon substrate 12 is used as a diaphragm 15. A piezoelectric element 16 is adhered onto the diaphragm 16.

While the micro-fluid transferring system can be fabricated in such a way, the system can also be fabricated using a prior art publicly known method, other methods or other materials.

As the piezoelectric element 16, similar to the above examples, for example a PZT ceramics thin plate is used. Two electrodes for driving the piezoelectric element 16 is wire-led out onto surfaces at both sides of the piezoelectric element 16 and connected to a flexible cable or the like to be further connected to a driving circuit DR by the flexible cable.

The piezoelectric element 16 is applied with a voltage of a waveform shown in FIG. 29(a) or FIG. 30(a) to thereby cause the diaphragm 15, which is a silicon thin film, and the piezoelectric element 16 to be subjected to a bending deformation in the unimorphic mode and to increase or decrease a volume of the chamber 20.

For example, when a driving voltage of a triangular waveform is used for simplicity as shown in FIG. 31(a), a volume of the chamber 20, as shown in FIG. 31(b), alters according to the waveform of the driving voltage.

Now, in this embodiment, the first, second and third opening sections 22, 24 and 26 are set so that change ratios in flow channel resistance thereof are different from each other when a pressure in the chamber 20 is raised or lowered. The change ratios are set so as to decrease in the order of the first, second and third opening sections, that is, so that the first opening section 22 shows the largest change ratio, the second section 24 shows the second largest change ratio and the third opening section 26 shows the lowest change ratio.

That is, the first opening section 22, as shown in FIG. 28, shows a low flow channel resistance when a difference in pressure between both ends thereof is close to zero, but with an increased differential pressure, a flow channel resistance becomes larger. In other words, the first opening section 22 has a large differential pressure dependency. The third opening section 26 shows a large channel resistance when a differential pressure is close to zero, but has nearly no differential pressure dependency and even if a differential pressure becomes larger, a flow channel resistance increases to a value of the order a little larger than before. A differential pressure dependency of a flow channel resistance of the second opening section 24 show an intermediate value between those of the first opening section 22 and the third opening section 26.

Such flow channel resistance characteristics can be selected according to whether or not a fluid, for example a liquid, flowing in a flow channel assumes a laminar flow or a turbulent flow depending on a value of a differential pressure, or alternatively, selected so as to assume a laminar flow regardless of a value of a differential pressure. That is, shapes of the first, second and third opening sections 22, 24 and 26 may be designed so that a laminar flow grows to a more sufficient level while suppressing occurrence of a turbulent flow to a lower level in the order of the first, second and third opening sections 22, 24 and 26.

To be concrete, for example, the first opening section 22 is designed as an orifice with a short flow channel length, the third opening section 26 is designed as a nozzle with a long flow channel length and the second opening section 24 is designed to have an intermediate length therebetween.

A construction is recommended when viewed from another angle in which the opening sections 22, 24 and 26 are designed so as to be uniform in flow channel section, a ratio of a flow channel length to a sectional area is set so as to increase in the order of the first, second and third opening sections 22, 24 and 26, and dimensional shapes thereof have regions in which flow channel resistance values of respective opening sections are inverted in magnitude between each other in an actually used range of differential pressures.

Accordingly, focusing attention on the first opening section 22 and the third opening section 26, as a pressure is increased with a large pressure change ratio (or fast change speed in pressure) of the chamber 20, a differential pressure increases to thereby cause a flow channel resistance of the opening section 22 to become larger than a flow channel resistance of the opening section 26, with the result that almost all the fluid in the chamber 20 is discharged from the opening section 26. As a pressure is reduced with a small pressure change ratio (or slow change speed in pressure) of the chamber, a differential pressure is maintained at a small value to cause a flow channel resistance of the opening section 22 to be smaller than a flow channel resistance of the opening section 26 and to cause more of a fluid to flow into the chamber 20 from the opening section 22.

Contrary to this, as a pressure is increased with a small pressure change ratio (or slow change speed in pressure) of the chamber 20, a differential pressure is maintained at a small value to cause a flow channel resistance of the opening section 22 to be smaller than a flow channel resistance of the opening section 26 and to cause more of a fluid in the chamber 20 to be discharged from the opening section 22. As a pressure is reduced with a large pressure change ratio (or fast change speed in pressure) of the chamber 20, a differential pressure becomes larger to cause a flow channel resistance of the opening section 22 to be larger than a flow channel resistance of the opening section 26 and to cause more of a fluid to flow into the chamber 20 from the opening section 26.

Such a pressure control of the chamber 20 is realized by controlling a driving voltage supplied to the piezoelectric element 16 to further controlling a deformation amount of a diaphragm and a timing. For example, by applying a driving voltage of the waveform shown in FIG. 29(a) to the piezoelectric element 16, a fluid is discharged into the flow channel 35 side while by applying a driving voltage of the waveform shown in FIG. 30(a), a fluid is discharged into the flow channel 30 side.

In FIGS. 29(a) and 29(b), and FIGS. 30(a) and 30(b), the maximum voltage e1 applied to the piezoelectric element 16 is on the order in the range of from several volts to tens of volts and on the order of 100 volts at the highest. Furthermore, taking up one examples associated with a time, times T1 and T7 are on the order of 20 μs, times T2 and T6 are on the order in the range of from 0 to several μs and times T3 and T5 are on the order of 60 Its. Times T4 and T8 may also be 0. A frequency of a driving voltage is on the order of 11 kHz. With driving voltages shown in FIG. 29(a) and FIG. 30(a) applied, for example, flow rates as shown in FIG. 29(b) and FIG. 30(b) are obtained in the flow channel 35. Note that flow rate curves in FIG. 29(b) and FIG. 30(b) show flow rates obtained by a pumping action as a model and inertia vibrations are actually superimposed on the flow rate curves. Therefore, actual flow rates are shown by curves obtained by superimposing a vibration component on the flow rate curves shown in the figures.

However, since the second opening section 24 participates in discharge and intake, an actual fluid flow is more complex.

Therefore, such flow channel resistance characteristics of the opening sections 22, 24 and 26 are used not only to generate a pressure in the chamber 11, but also to control a change ratio in pressure, and to thereby transport a liquid at a flow rate and in a direction according to values of flow channel resistance of the opening sections 22, 24 and 26 at that time, thereby enabling plural fluid flows to be merged or a fluid flow to be divided into plural fluid flows.

For example, as shown in FIG. 29 and FIG. 30, at least two kinds of driving voltage waveforms are prepared and changeover is performed therebetween. Furthermore, the maximum voltage e1 may be altered with the same waveform adopted. Furthermore, a waveform and a maximum voltage are arbitrarily altered to enable a fine control of a discharge direction, a flow rate, a flow rate ratio and the like.

In a case where fluids from plural flow channels are merged in the chamber 20, the chamber can work for example as a mixer. In a case where a fluid is discharged into plural flow channels from the chamber 20, the chamber can work as pumps discharging fluids at prescribed ratios to the plural flow channels, or alternatively, as a flow divider or a flow channel change-over unit.

The flow channel resistance characteristic curves of the three opening sections 22, 24 and 26, as shown in FIG. 28, are more effectively set in a relation in which the curves intersect with each other in a range of differential pressures in use. This is because values of flow channel resistance between any two flow channels are inverted in a transition from a case where a differential pressure is larger in absolute value than the differential pressure as the center at an intersection of the curves to a case where a differential pressure is smaller in absolute value than the differential pressure as the center, or vice versa, thereby enabling achievement of improvement on a flow rate efficiency. While that in such a way, values of flow channel resistance are inverted in magnitude is not necessarily required in order to cause a fundamental function as a microfluid system 1 to be fully exerted, it is an important factor to improve a flow rate efficiency.

Furthermore, in FIG. 28, the three curves do not intersect with each other at a single point, and, therefore, in a certain differential pressure range, the large and small order of the flow channel resistances of the three opening sections 22, 24 and 26 is changed. By setting changes in flow channel resistance characteristics in a suitable way, various functions described above can be enhanced to respective higher levels.

Then, there are shown concrete examples of dimensions of sections.

The opening section 22 is on the order of 25 μm in width and on the order of 25 μm in length. The opening section 24 is on the order of 30 μm in width and on the order of 90 μm in length. The opening section 26 is on the order of 36 μm in width and on the order of 180 μm in length. A depth of the opening sections 22, 24 and 26 are all on the order of 25 μm and all have a uniform sectional shape (a section of a flow channel) in the length direction of a flow channel (the direction of a flow of a fluid).

Note that, on this occasion, a value of L/S, that is [a flow channel length/a sectional area] (in units of $\mu m^{-1}$) is 0.04 in the opening section 22, 0.12 in the opening section 24 and 0.20 on the opening section 26, that is a value of [a flow channel length/a sectional area] increases in the ascending order of the first opening section 22, the second opening section 24 and the third opening section 26.

While a letter L used here is a length of a flow channel of an opening section, a case arises where which length is a proper one is not clear according to shapes of both ends of the opening section. In this case, experiments have only to be conducted concerning opening sections with various kinds of shapes to find equivalent flow channel lengths of the actual opening sections based on results of the experiments and to use the equivalent flow channel lengths as effective flow channel lengths. This is true for a sectional area S.

Note that the flow channels 30, 34 and 35 each may be a flow channel in a literal sense in order that a fluid is caused to flow through and guided to a prescribed position and a chamber to conduct a reaction with a fluid, or alternatively, a something like a reservoir to store a fluid. In the following description of the present specification, they are also collectively referred to "a flowing channel."

According to a micro-fluid transferring system, a pumping action for plural flow channels 30, 34 and 35 can be performed by a single chamber 20 and control can be exerted of a flow rate and a direction of discharge from or intake into the flow channels 30, 34 and 35. A single piezoelectric element 16 for change in volume of each chamber 20 sufficiently works to thereby cause a construction to be simple and a control to be easy; thereby enabling a stable liquid transport to be performed. Flow channel resistance characteristics of the respective opening sections 22, 24 and 26 are set in any suitable way to control a driving voltage applied to the piezoelectric element 16 and to thereby enabling plural fluid flows to be merged at prescribed ratios or enabling a fluid flow to be divided into plural fluid flows at prescribed ratios.

While in the above embodiment, a driving voltage of a triangular waveform or an approximately triangular waveform is applied to the piezoelectric element 16, various other kinds of waveforms can be used. The bottom line is that a driving waveform may be any with which a speed of oscillation of increase or decrease in volume of the chamber 20 is made different according to whether it is at a timing of a rise or a fall, in which state the absolute value of the speed has only to be able to change.

Figure 32:
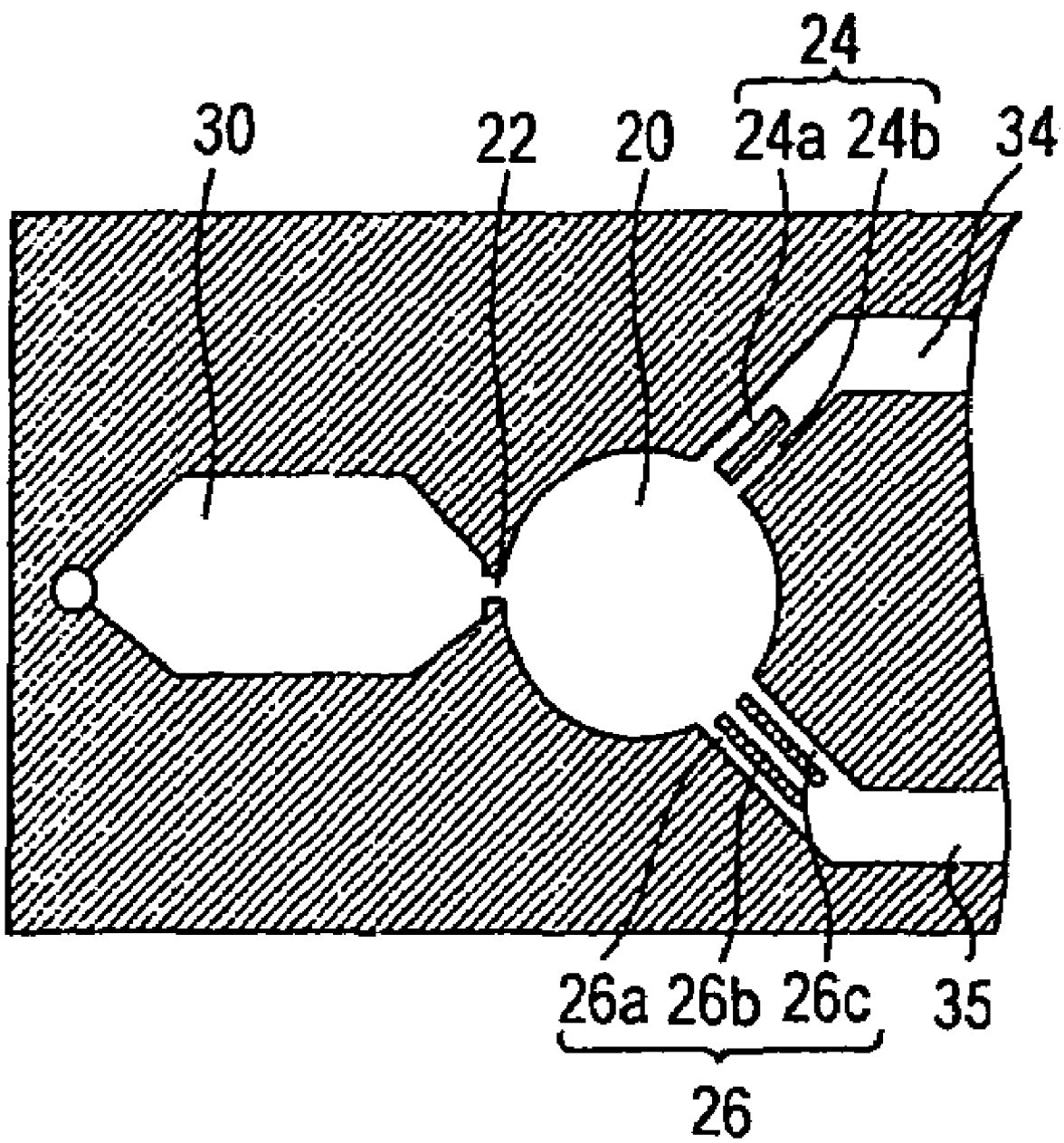
FIG. 32 is a model plan view showing a construction of a fluid transferring system of a first modification relating to the fourth embodiment of the present invention.

Then, description will be given of a micro-fluid transferring system according to the first modification of a fourth embodiment with reference to FIG. 32. Note that in this modification, constituents having the same functions as in the fourth embodiment are attached with the same symbols and any of descriptions thereof is omitted for simplicity.

In this modification, there is provided an opening section group 24B including two opening sections 24a and 24b connected in parallel to each other in a second flow channel 34 and an opening section group 26B including two opening sections 26a, 26b and 26c connected in parallel to each other in a third flow channel 26.

That is, the two opening sections 24a and 24b constitutes the opening section group 24B and are equal in length, sectional shape and effective sectional area to each other. Compared with the opening section 24 shown in FIG. 26, a length of each is twice but an effective sectional area of each is equal thereto. With such a construction adopted, a flow channel resistance value as a whole of the opening section group 24B is generally almost equal to that of the opening section 24 of FIG. 26, but a change ratio in flow channel resistance as a whole of the opening section group 24B decreases, resulting in small pressure dependency.

The three opening sections 26a, 26b and 26c constitute the opening section group 26B and are equal in length, sectional shape and effective sectional area to each other. Compared with the opening section 26 shown in FIG. 26, a length of each is thrice but an effective sectional area of each is equal thereto. With such a construction adopted, a flow channel resistance value as a whole of the opening section group 26B is generally almost equal to that of the opening section 26 of FIG. 26, but a change ratio in flow channel resistance as a whole of the opening section group 26B decreases resulting in pressure dependency smaller than the opening section group 24B.

For example, in a case where plural opening sections are arranged in parallel to each other without any interference with each other, a value obtained as a reciprocal of the sum of individual reciprocals of flow channel resistance values of the plural opening sections can be used as a flow channel resistance as a whole of a group of the plural opening sections.

At least one (in this embodiment, all of them) of the opening sections 26a, 26b and 26c provided in the third flow channel 26 is larger in value of [a flow channel length/a sectional area] than the opening section 22, or any of the opening sections 24a and 24b provided in the other flow channels 30 and 34.

Furthermore, at least one (in this embodiment, all of them) of the opening sections 24a and 24b provided in the second flow channel 24 is larger in value of [a flow channel length/a sectional area] than any of the opening sections 26a, 26b and 26c provided in the flow channel 26.

With reduction in section of the flow channels using the opening section groups 24B and 26B each including plural opening sections connected in parallel to each other, a pressure dependency as a whole of each of the opening section groups 24B and 26B can be decreased to thereby increase a difference in pressure dependency from other opening sections or opening section groups; thereby enabling improvement on a flow rate characteristic as a pump.

Then, description will be given of a behavior of a fluid in a case where a micro-fluid transferring system.

The following Tables 1 and 2 show flow channel resistance characteristics and flow rates of the respective opening sections 22, 24 and 26 in the micro-fluid transferring system 1.

TABLE 1

Differential Pressure Dependency of Each Opening Section ($\times 10^{12}$ N·S/m5)

| | Differential Pressure | | |
|---|---|---|---|
| | 1 kPa | 10 kPa | 100 kPa |
| Opening Section 22 | 3.2 | 6.2 | 15.4 |
| Opening Section 24 | 5.0 | 7.2 | 15.8 |
| Opening Section 26 | 7.6 | 9.0 | 15.9 |

TABLE 2

Flow Rate of Each Opening Section

| | Differential Pressure | | |
|---|---|---|---|
| | 1 kPa | 10 kPa | 100 kPa |
| Opening Section 22 | 48.5% | 39.2% | 34.0% |
| Opening Section 24 | 31.1% | 33.8% | 33.1% |
| Opening Section 26 | 20.4% | 27.0% | 32.9% |

The following Table 3 shows a discharge fluid volume in each time of the respective opening sections 22, 24 and 26 in the micro-fluid transferring system 1, and Table 4 shows the driving conditions of the driving patterns A thought D in the Table 3.

TABLE 3

Discharge Fluid Volume of Each Opening Section per One Capacity Change (±100 pl) of Chamber

| | Driving Pattern | | | |
|---|---|---|---|---|
| | A | B | C | D |
| Opening Section 22 | 9.3 | 5.2 | −9.3 | −5.2 |
| Opening Section 24 | −2.7 | 0.7 | 2.7 | −0.7 |
| Opening Section 26 | −6.6 | −5.9 | 6.6 | 5.9 |

TABLE 4

Driving Conditions of Driving Patterns A though D

| | Compression State | Decompression State |
|---|---|---|
| A | 1 kPa | 10 kPa |
| B | 10 kPa | 100 kPa |
| C | 10 kPa | 1 kPa |
| D | 100 kPa | 10 kPa |

Herein, definition is given so that flow channel resistance values of the opening sections 22, 24 and 26 at a pressure in the chamber 20 when a volume thereof is on the decrease are $R1r$, $R2r$ and $R3r$, respectively, and volumes of a fluid coming in and going out of the flow channels 30, 34 and 35 at that time are $V1r$, $V2r$ and $V3r$, respectively.

Furthermore, definition is given so that flow channel resistance values of the opening sections 22, 24 and 26 at a pressure in the chamber 20 when a volume thereof is on the increase are $R1f$, $R2f$ and $R3f$, respectively, and volumes of a fluid coming in and going out of the flow channels 30, 34 and 35 at that time are $V1f$, $V2f$ and $V3f$, respectively.

In addition, a change amount in volume of the chamber 20 (a width of the oscillation) is indicated with $V0$ by definition. At this time, for example, a volume $\Delta V1$ of a fluid fed out through the first flow channel 30 in one cycle of volume increase/decrease oscillations of the chamber 20 is expressed approximately by the following formulae (, which would be somewhat modified, actually, because of inertia vibrations added thereto):

$$\Delta V1 = V1r - V1f$$

$$V1r = V0x(1/R1r)/[(1/R1r)+(1/R2r)+(1/R3r)]$$

$$V1f = V0x(1/R1f)/[(1/R1f)+(1/R2f)+(1/R3f)]$$

Likewise, as for the second flow channel 34 and the third low channel 35, a volume of a fluid fed out through the second flow channel 34 or the third flow channel 35 in one cycle of volume increase/decrease oscillations of the chamber 20 can be calculated.

Herein, in a case where flow channel resistance characteristics of the opening sections are as shown in Table 1, volumes of a fluid fed out through the respective flow channels in one cycle of volume increase/decrease oscillations of the chamber 11 are as shown in Table 3 using the above formulae.

Note that in the Table 3, a number with a plus sign expresses a discharge direction and a number with a minus sign expresses an intake direction. As is clear from the Table 3, flow ratios in the opening sections and a direction of a fluid can be changed over differently by altering a driving pattern of the chamber 20.

Control of a pressure accompanying increase/decrease in volume of the chamber 20, for example, with a fine adjustment of a rise time, a fall time or the like of a driving voltage waveform also enables a subtle adjustment of a flow rate and a flow ratio.

In the above embodiment, while the number of flow channels is three, but four or more may be adopted. Any of flow channels may have an opening section group including plural opening sections. Furthermore, an opening section group provided in a flow channel may be constituted of four or more opening sections.

In the above embodiment, the flow channels 30, 34 and 35 may also be ones in a circulation system. A construction may be adopted in which the flow channels 30, 34 and 35 are merged at a position remote from the chamber 20. In that case as well, the flow channels is unnecessary be handled as a single flow channel, but may be handled as individual flow channels connected to the chamber 20.

While in the above fourth embodiment and the modification thereof, there is shown an example in which a micro-fluid system is fabricated using a silicon substrate, the system may be micro-fabricated using a material such as a resin, glass, a metal, a ceramic or the like. The diaphragm is unnecessary to be formed by half etching, but may be formed by laminating a thin plate prepared separately. In the latter case, any material may be adopted, but a caution should be taken because of a possibility that no sufficient displacement characteristic cannot be obtained in a case where the material is extremely softer than a piezoelectric element.

While in the above fourth embodiment and the modification thereof, a depth of the chamber 20 is the same as an opening section, no necessity exists for being the same but a depth of the chamber 20 may be either deeper or shallower than the opening section. A deformation of the piezoelectric element 16 serving as an actuator to increase/decrease a volume of the chamber 20 is of no inevitability of unimorph bending deformation but may be caused by a vertical vibration, a lateral vibration, a shear deformation oscillation or the like. As the actuator, no specific limitation is placed on the piezoelectric element 16, but any of members such as an electrostatic actuator, an electromagnetic actuator, a shape-memory alloy or the like can be used as far as the members can increase or decrease a volume of the chamber 20. Furthermore, the actuator is not integrated with the micro-fluid transferring system into one piece, but may be separable as a different identity.

Though as to a shape of an opening section, a flow channel thereof is said to be uniform in section, no necessity arises for a perfect uniformity in section. In other words, a uniform sectional shape is not necessary required. For example, there are allowed the presence of projections and depressions or tapers at some level on the inner surface. A practical sectional area or an effective sectional area in each of such cases can be obtained based on experimental values or calculated values. A widening portion with some extent area or a smoothly widening edge-rounded portion can be allowed in the vicinity of the inlet/outlet of an opening section, especially at an opening section on the discharge (outlet) side. Moreover, in an opening section in the side serving as the intake port (inlet), no function changes to a great extent even without a uniform sectional shape. A fluid that is applicable may be a liquid, a fluidized mass, a gas or the like.

Note that the present invention is not limited to the above embodiments and their modifications, but can be implemented in various other embodiments.

For example, the present invention is not limited to a case where two flow channels communicating with a chamber of a micropump, but a case may be adopted where three or more independent flow channels communicate with a micropump as described in connection with the second modification of the first embodiment. Furthermore, a case is also adopted where flow channels connected to the chamber of a micropump are further connected to each other to thereby construct a liquid circulating system.

Figure 33A:
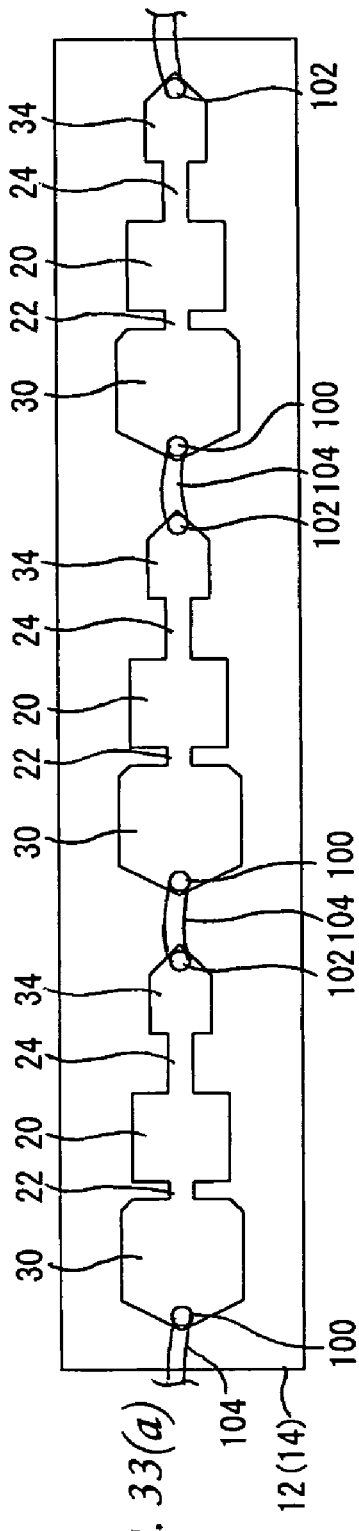
FIG. 33(a) to FIG. 33(c) are another examples to which fluid transferring system of the present invention is applicable.
Figure 33B:
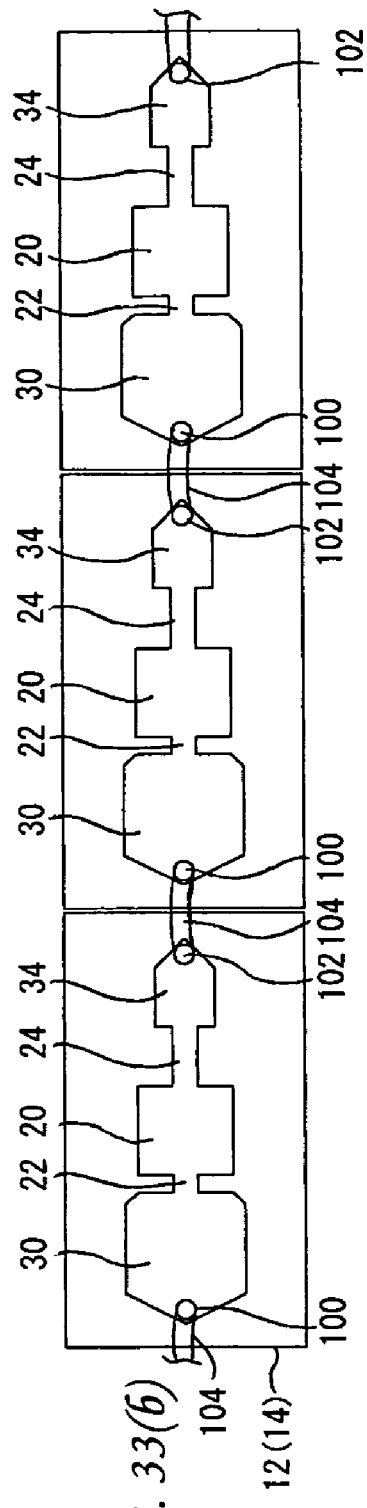
Figure 33C:
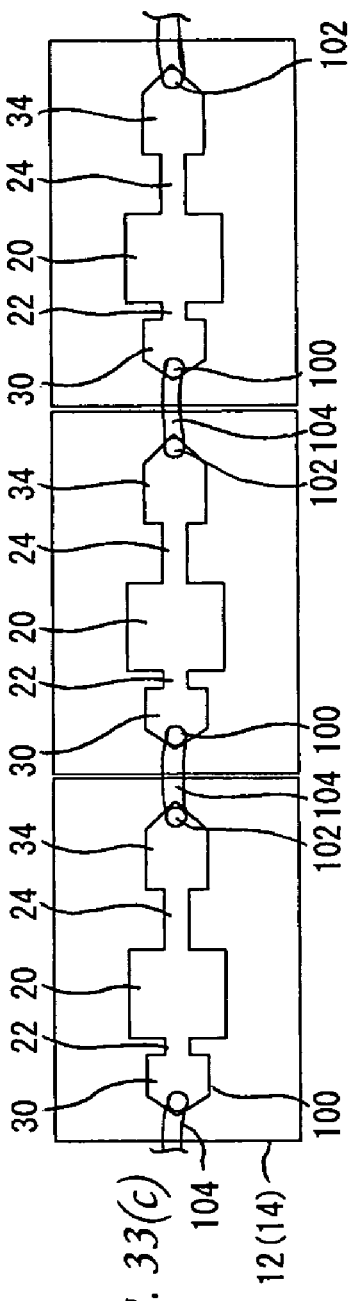

As another examples, FIGS. 33(a) through 33(c) are another structures of fluid transferring systems to which the present invention is applicable. FIG. 33(a) is a bottom view of a fluid transferring system. In this example, three discrete fluid transferring portions are provided in a single cell. The single cell mainly comprises, like as the first embodiment, a base plate 12 and a flat thin plate 14 bonded together. Formed on the upper surface of the base plate 12 are three sets of recesses: each set comprises, from left side in this order, recesses for a liquid reservoir 30, a first opening section 22, a chamber 20, a second opening section 24, and a flow channel 34. On the upper surface of thin plate 14, a piezoelectric element (not shown) is fixed at a position corresponding to the chamber 20 to form an actuator. The chamber 20, and first and second opening sections 22 and 24 constitute a micropump like as the above mentioned embodiments. At a left edge of the liquid reservoir 30 and right edge of the flow channel 34, respectively formed are through holes 100 and 102 that allow each fluid transferring portion to be fluidically connected to neighboring fluid transferring portion or a fluid transferring portion of another system through a detachable connecting flow channel 104. The connecting flow channel 104 may be in a form of a tube of which the bilateral ends are connected to the through holes 100 and 102. Alternatively, the connecting flow channel 104 may be in a form of a groove formed on a flat thin plate. In this case, the flat thin plate may be layered on the bottom surface of the base plate 12 to form the connecting flow channel between the bottom surface of the base plate 12 and an inner surface of the groove The micropumps of the cell may be driven with different waveforms as mentioned in the third and fourth modifications of the third embodiment to prevent interference among the three micropumps. Any other modification mentioned in the previous modifications and embodiments may be applied to this system.

While the three fluid transferring portions are serially connected in the example shown in FIG. 33(a), the connections among the fluid transferring portions can be altered by simply changing the connecting flow channels 104. For instance, left two of the fluid transferring portions may be parallel each other with respect to the most right one portion by providing connecting flow channels that connect through holes 102 and 102 of the left two ones to the through hole 100 of the most right one. As explained above, the fluid transferring system of FIG. 33(a) has connection flexibility.

FIG. 33(b) shows a bottom view of second another structure of a fluid transferring system to which the present invention is applicable. This system differ from the system shown in FIG. 33(a) in that the three fluid transferring portions are independently provided on separate cells. Through holes of the cells may be fluidically connected to each other by detachable connecting flow channels. In this system, the connecting flow channels may be either of the tube and the flat thin plate. However, in a case where the connecting flow channel is in a form of a groove formed on a flat thin plate, a middle flat plate may be inserted between the flat thin plate and each of the bottom surfaces of the base plates of the units to prevent of liquid or gas from leaking. The middle plate preferably has through holes at positions corresponding to the through holes of the cells, and forms U shaped connecting flow channel together with the flat thin plate. This system has connection flexibility like as the system shown in FIG. 33(a). Moreover, since the system shown in FIG. 33(b) is made up of separate units, the system can be repaired by simply replace defective unit with new unit.

FIG. 33(c) is a bottom view of third another example of the fluid transferring system to which the present invention is applicable. This system differ from the system shown in FIG. 33(b) in that no liquid reservoir is provided in each cell, and each of the connecting flow channels per se has an acoustic capacitance (modulus of elasticity) larger than a predetermined value. Since each of connecting flow channels has large acoustic capacitance, it can be treated as a pressure absorbing section. In this system, each cell can be made simple and small since no pressure absorbing section is formed in the cell.

Moreover, the present invention is not limited to a liquid, but can be applied to all kinds of fluids including gases.

A micropump relating to the present invention can be used in various kinds of application fields, such as environmental preservation, food, biochemistry, immunology, hematology, gene analysis, synthesis, drug discovery and others.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A micropump comprising:
  a chamber;
  a first opening section including a plurality of sub-opening sections, each of the sub- opening sections being for connecting the chamber with a first fluid transferring portion, the sub-opening sections having an effective sectional area smaller than that of the first fluid transferring portion and showing, as a whole, a first flow channel resistance that changes depending on change in differential pressure between the chamber and the first fluid transferring portion;
  a second opening section for connecting the chamber with a second fluid transferring portion, the second opening section having an effective sectional area smaller than that of the second fluid transferring portion, the second opening section showing a second flow channel resistance that changes depending on change in differential pressure between the chamber and the second fluid transferring portion,
  wherein the differential pressure dependency of the first flow channel resistance is smaller than that of the second flow channel resistance; and
  a thin plate combined to the chamber;
  a driving circuit adapted to drive the thin plate so that a volume of the chamber is rapidly reduced and then a volume of the chamber is gradually restored to transfer a liquid in one direction and a volume of the chamber is gradually decreased and then a volume of the chamber is rapidly restored to transfer a liquid in the other direction.

2. A micropump as claimed in claim 1, further comprising:
  a third opening section for connecting the chamber with a third fluid transferring portion, the third opening section having an effective sectional area smaller than that of a the third fluid transferring portion, the third opening section showing a third flow channel resistance that changes depending on change in differential pressure between the chamber and the third fluid transferring portion,
  wherein the differential pressure dependency of the first flow channel resistance is smaller than that of the third flow channel resistance.

3. A micropump as claimed in claim 1, wherein, in the sub-opening sections of the first opening section, the minimum of ratios of flow channel lengths to sectional areas of the respective sub-opening sections is larger than a ratio of flow channel length to the sectional area of the second opening section.

4. A micropump comprising:
  a chamber;
  a first opening section including a plurality of sub-opening sections, each of the sub-opening sections being for connecting the chamber with a first fluid transferring portion, the sub-opening sections having an effective sectional area smaller than that of the first fluid transferring portion and showing, as a whole, a first flow channel resistance that changes depending on change in differential pressure between the chamber and the first fluid transferring portion; and
  a second opening section for connecting the chamber with a second fluid transferring portion, the second opening section having an effective sectional area smaller than that of a the second fluid transferring portion, the second opening section showing a second flow channel resistance that changes depending on change in differential pressure between the chamber and the second fluid transferring portion,
  wherein the differential pressure dependency of the first flow channel resistance is smaller than that of the second flow channel resistance and a flow channel length of the first opening section is longer than a flow channel length of second opening section and, in the sub-opening sections of the first opening section, the minimum of ratios of flow channel lengths to sectional areas of the respective sub-opening sections is larger than a ratio of flow channel length to the sectional area of the second opening section.

* * * * *

UNITED STATES PATENT AND TRADEMARK OFFICE
CERTIFICATE OF CORRECTION

| | | |
|---|---|---|
| PATENT NO. | : 7,682,138 B2 | Page 1 of 1 |
| APPLICATION NO. | : 11/416532 | |
| DATED | : March 23, 2010 | |
| INVENTOR(S) | : Kusunoki Higashino et al. | |

It is certified that error appears in the above-identified patent and that said Letters Patent is hereby corrected as shown below:

Column 1:
Line 9, delete "Aug. 22," and insert -- Aug. 22, 2006, --.

Signed and Sealed this

Eighth Day of June, 2010

David J. Kappos
*Director of the United States Patent and Trademark Office*